United States Patent
Kim et al.

(10) Patent No.: US 9,335,955 B2
(45) Date of Patent: May 10, 2016

(54) NONVOLATILE MEMORY DEVICE AND RELATED DATA MANAGEMENT METHOD

(71) Applicant: SAMSUNG ELECTRONICS CO., LTD., Suwon-Si, Gyeonggi-Do (KR)

(72) Inventors: Kwanghoon Kim, Seoul (KR); Junjin Kong, Yongin-Si (KR); Hong Rak Son, Anyang-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 315 days.

(21) Appl. No.: 13/935,593

(22) Filed: Jul. 5, 2013

(65) Prior Publication Data

US 2014/0025887 A1 Jan. 23, 2014

(30) Foreign Application Priority Data

Jul. 23, 2012 (KR) ........................ 10-2012-0080206

(51) Int. Cl.
*G06F 3/06* (2006.01)
*G06F 11/10* (2006.01)

(52) U.S. Cl.
CPC ............ *G06F 3/0689* (2013.01); *G06F 3/0619* (2013.01); *G06F 3/0665* (2013.01); *G06F 11/108* (2013.01)

(58) Field of Classification Search
None
See application file for complete search history.

(56) References Cited

U.S. PATENT DOCUMENTS

| | | |
|---|---|---|
| 2009/0204758 A1 | 8/2009 | Luning |
| 2010/0073860 A1 | 3/2010 | Moriai et al. |
| 2010/0332749 A1 | 12/2010 | Benhase et al. |
| 2011/0066882 A1 | 3/2011 | Walls et al. |
| 2011/0271039 A1 | 11/2011 | Baek et al. |
| 2012/0260146 A1 | 10/2012 | Lee et al. |

FOREIGN PATENT DOCUMENTS

| | | |
|---|---|---|
| JP | 2010079445 | 4/2010 |
| KR | 1020110093035 A | 8/2011 |
| KR | 1020120115012 A | 10/2012 |

OTHER PUBLICATIONS

Massiglia, The RAIDbook, © 1997 RAID Advisory Board, p. 108-110.*

* cited by examiner

*Primary Examiner* — Brian Peugh
(74) *Attorney, Agent, or Firm* — Volentine & Whitt, PLLC

(57) ABSTRACT

A method of operating a nonvolatile memory device comprising a plurality of memory blocks comprises storing first data and second data to be stored in a hot memory block of the memory blocks in a first buffer, transferring the first data stored in the first buffer to a second buffer to program the first data in the hot memory block, and generating RAID parity data based on the first and second data, wherein the RAID parity data and the first data form part of the same write stripe.

20 Claims, 20 Drawing Sheets

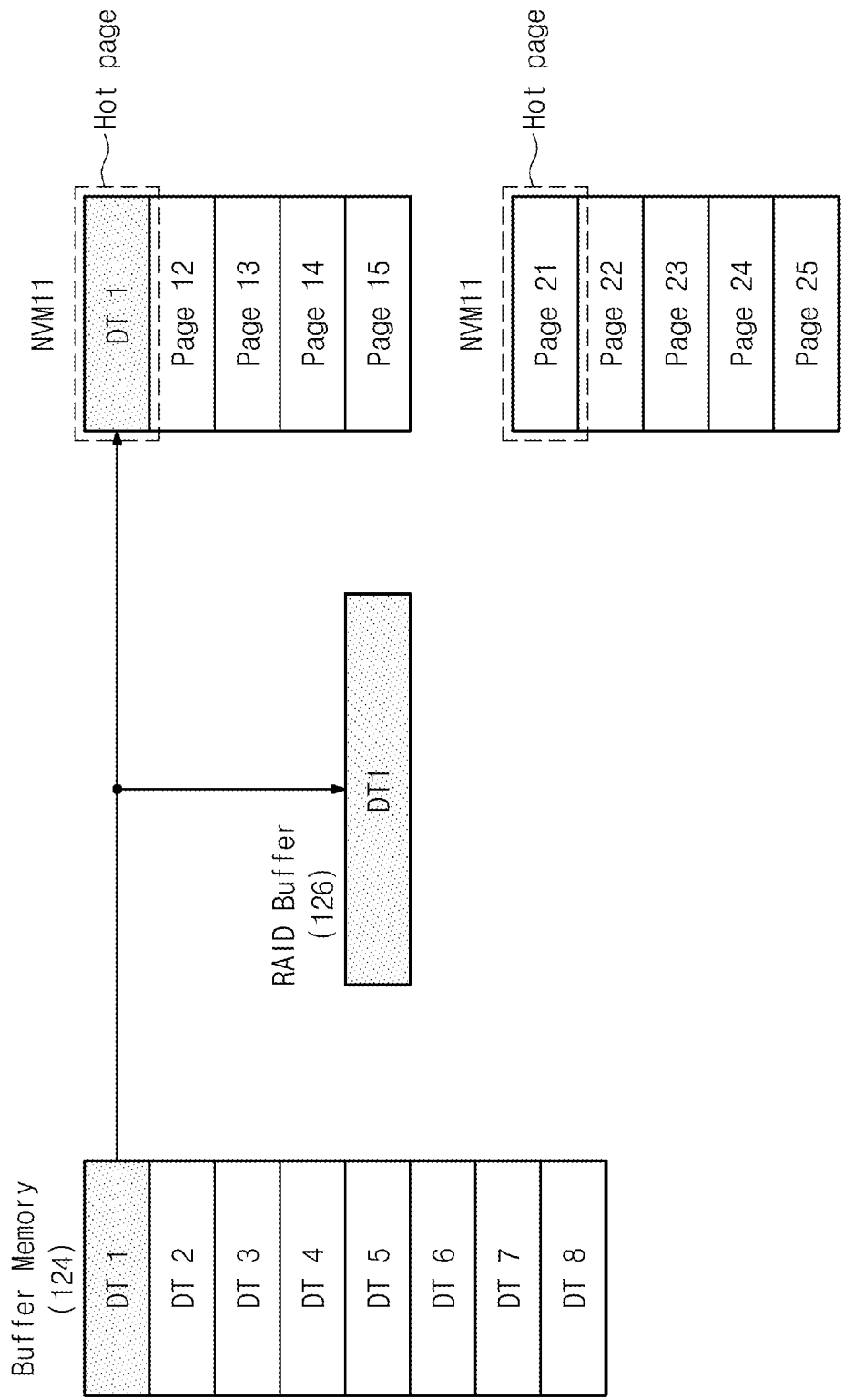

NONVOLATILE MEMORY DEVICE AND RELATED DATA MANAGEMENT METHOD

CROSS-REFERENCE TO RELATED APPLICATIONS

This application claims priority under 35 U.S.C. §119 to Korean Patent Application No. 10-2012-0080206 filed Jul. 23, 2012, the subject matter of which is hereby incorporated by reference.

BACKGROUND OF THE INVENTION

The inventive concept relates generally to electronic data storage technologies. More particularly, certain embodiments of the inventive concept relate to nonvolatile memory devices and related data management methods.

Semiconductor memory devices can be roughly divided into two categories according to whether they retain stored data when disconnected from power. These categories include volatile memory devices, which lose stored data when disconnected from power, and nonvolatile memory device, which retain stored data when disconnected from power. Examples of volatile memory devices include DRAM and SRAM, and examples of nonvolatile memory devices include EEPROM, FRAM, PRAM, MRAM, and flash memory.

Among nonvolatile memories, flash memory has gained popularity in recent years due to attractive features such as relatively high performance and data storage capacity, efficient power consumption, and an ability to withstand mechanical shock. Flash memory can currently be found in a wide variety of electronic devices, ranging from cellular phones, PDAs, digital cameras, laptops, and many others.

Flash memory also suffers from certain drawbacks, such as potential failures due to limited program/erase endurance or various electrical malfunctions, for example. Consequently, nonvolatile memory devices also commonly use techniques such as bad block management, wear leveling, metadata mirroring, in an effort to minimize these various sources of failures. Unfortunately, many conventional techniques fail to adequately prevent certain types of errors that may be generated more readily in specific memory blocks or certain types of errors that arise after prolonged use of a data storage device.

SUMMARY OF THE INVENTION

In one embodiment of the inventive concept, a nonvolatile memory device comprises a nonvolatile memory comprising a plurality of memory blocks, and a controller configured to control the nonvolatile memory. The controller identifies at least one of the memory blocks as a hot memory block and generates at least first and second RAID parity data based on first data corresponding to a first hot page of the hot memory block, wherein the first data and the first RAID parity data form part of a first write stripe, and the second RAID parity data forms part of a second write stripe different from the first write stripe.

In another embodiment of the inventive concept, a data management method for a nonvolatile memory device comprising a plurality of memory blocks comprises storing first data and second data to be stored in a hot memory block of the memory blocks in a first buffer, transferring the first data stored in the first buffer to a second buffer to program the first data in the hot memory block, and generating RAID parity data based on the first and second data, wherein the RAID parity data and the first data form part of the same write stripe.

In another embodiment of the inventive concept, a nonvolatile memory device comprises a nonvolatile memory comprising a plurality of memory cells arranged in a three-dimensional structure, and a controller configured to control the nonvolatile memory. The controller identifies memory cells adjacent to a common source line as a plurality of hot pages, wherein each of the hot pages is used to generate at least two different units of RAID parity data.

These and other embodiments of the inventive concept can potentially improve the reliability of nonvolatile memory devices by expanding the conditions under which data recovery can be achieved.

BRIEF DESCRIPTION OF THE DRAWINGS

The drawings illustrate selected embodiments of the inventive concept. In the drawings, like reference numbers indicate like features.

FIGS. 6A, 6B, 6C and 6D are diagrams illustrating a method of generating RAID parity data according to an embodiment of the inventive concept.

DETAILED DESCRIPTION

Figure 1:
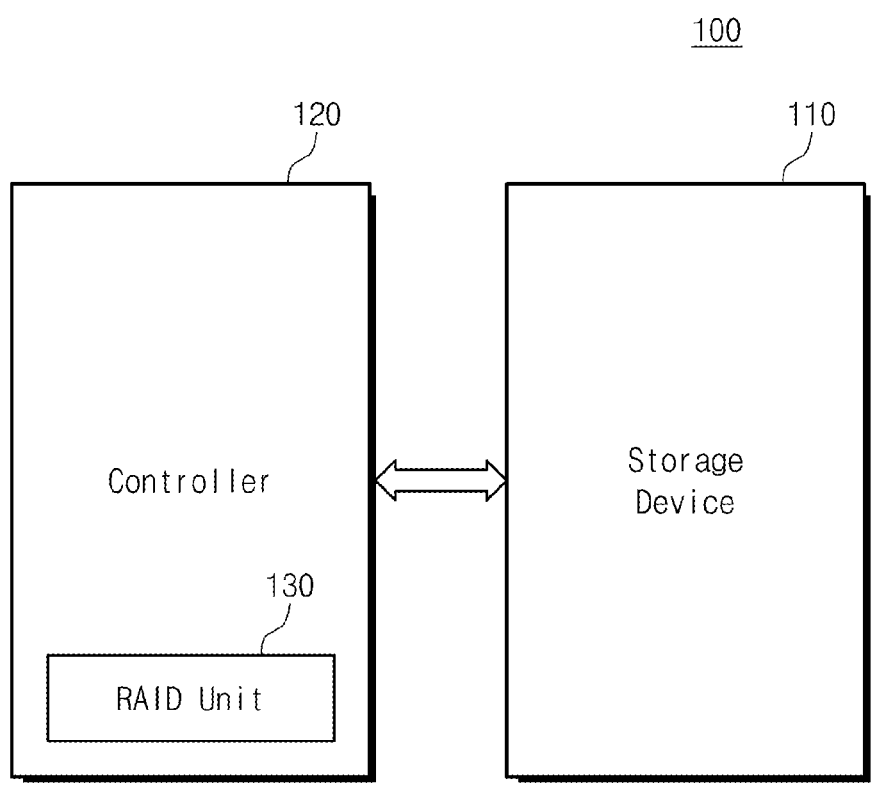
FIG. 1 is a block diagram illustrating a memory system according to an embodiment of the inventive concept.

Embodiments of the inventive concept are described below with reference to the accompanying drawings. These embodiments are presented as teaching examples and should not be construed to limit the scope of the inventive concept.

In the description that follows, the terms "first", "second", "third", etc., may be used to describe various elements, components, regions, layers and/or sections, but these elements, components, regions, layers and/or sections should not be limited by these terms. Rather, these terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Where an element or layer is referred to as being "on", "connected to", "coupled to", or "adjacent to" another element or layer, it can be directly on, connected, coupled, or adjacent to the other element or layer, or intervening elements or layers may be present. In contrast, where an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or the present specification and will not be interpreted in an idealized or overly formal sense unless expressly so defined herein.

FIG. 1 is a block diagram illustrating a memory system 100 according to an embodiment of the inventive concept. Memory system 100 is designed to prevent data loss using a RAID technique. In particular, memory system 100 may prevent loss of data stored in a hot page by using data to be stored in the hot page to generate multiple units of RAID parity data.

Referring to FIG. 1, memory system 100 comprises a storage device 110 and a controller 120. Storage device 110 can be used to store a variety of data such as a text, a graphic, a software code, and so on. Storage device 100 can be implemented by a nonvolatile memory or a plurality of nonvolatile memories. Storage device 110 can be implemented by a nonvolatile memory such as an Electrically Erasable Programmable Read-Only Memory (EEPROM), a flash memory, a Magnetic RAM (MRAM), a Spin-Transfer Torque MRAM (STT-MRAM), a Conductive bridging RAM (CBRAM), a Ferroelectric RAM (FeRAM), Ovonic Unified Memory (OUM), a Phase change RAM (PRAM), a Resistive RAM (RRAM or ReRAM), a Nanotube RRAM, a Polymer RAM (PoRAM), a Nano Floating Gate Memory (NFGM), a holographic memory, a Molecular Electronics Memory, or an Insulator Resistance Change Memory. For ease of description, it will be assumed that storage device 110 is implemented by a flash memory.

A nonvolatile memory used for storage device 110 comprises a plurality of memory blocks. A predetermined memory block of the memory blocks may be determined to be a hot memory block. In general, the term "hot memory block" will refer to a memory block that is frequency erased (or alternatively, programmed, for instance), and the term "hot page" may refer to pages of a hot memory block. For example, where a memory block is erased more than other memory blocks, it may be determined to be a hot memory block. Memory cells of the hot memory block may be physically deteriorated more than memory cells of the other memory blocks. The probability of read failure on data stored in the hot memory block may be higher than that on data stored in the other memory blocks. Memory system 100 comprises a RAID unit 130 to protect the reliability of data stored in the hot memory block.

Controller 120 stores data input from an external device in storage device 110 and transfers data read out from storage device 110 to the external device. In particular, controller 120 may manage data using the RAID scheme to protect the reliability of data stored in the hot memory block.

RAID unit 130 stores data in storage device 110 using the RAID technique at a program operation. Also, in a read operation, RAID unit 130 recovers data at which a read error is generated, using the RAID technique. RAID unit 130 controls a program operation such that data corresponding to a hot page is used to generate two different units of RAID parity data. The probability that read failure occurs in a read operation on data stored in the hot page may become high due to deterioration of a physical characteristic of the hot page.

Memory system 100 manages data corresponding to a hot page to be used to generate two different units of RAID parity data. Where read failure on data stored in the hot page is generated, the read failed data may be recovered using the two different units of RAID parity data. Thus, it is possible to protect the reliability of data stored in the hot page.

Where a read failure occurs with respect to at least two units of data in a stripe, the data causing the failure may not be recovered by a typical RAID technique. However, memory system 100 may recover at least two units of read failed data by generating two different units of RAID parity data using data corresponding to a hot page.

Figure 2:
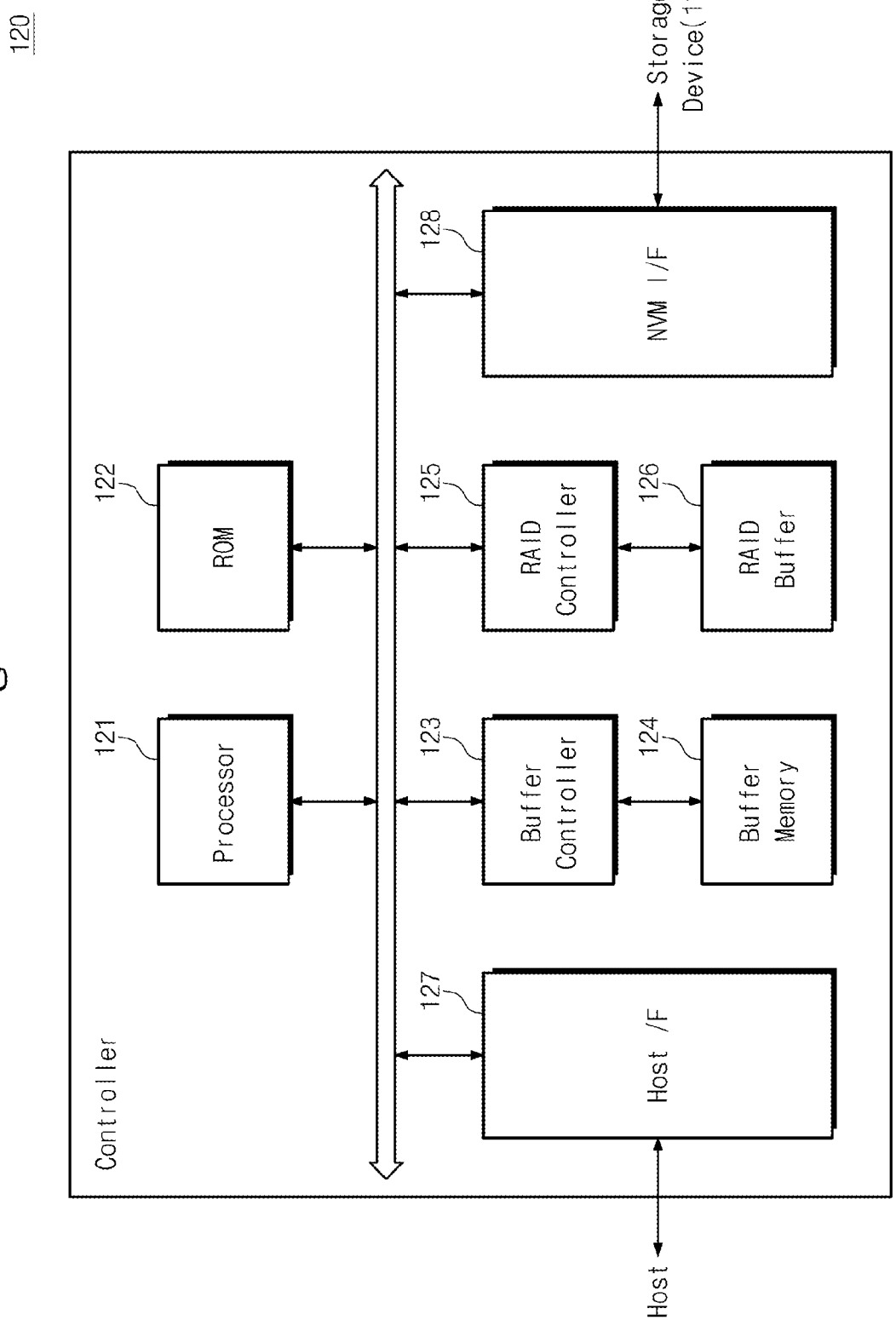
FIG. 2 is a block diagram illustrating an example of a controller shown in FIG. 1.

FIG. 2 is a block diagram illustrating an example of controller 120 of FIG. 1.

Referring to FIG. 2, controller 120 comprises a processor 121, a ROM 122, a buffer controller 123, a buffer memory 124, a RAID controller 125, a RAID buffer 126, a host interface 127, and a nonvolatile memory interface (hereinafter, referred to as an NVM interface) 128. Collectively, RAID controller 125 and RAID buffer 126 constitute a RAID unit 130 in FIG. 1.

Processor 121 controls overall operations of controller 120. For example, processor 121 may be configured to operate firmwire such as a flash translation layer (FTL) stored in ROM 122. For example, processor 121 may be configured to manage wear leveling and bad blocks of storage device 120 using the FTL.

Buffer controller 123 controls buffer memory 124 under control of processor 121. Buffer memory 124 temporarily stores data to be stored in storage device 110 or data read out from storage device 110.

RAID controller 125 controls RAID buffer 126 under control of processor 121. RAID buffer 126 may be used as a working memory to generate RAID parity data. RAID controller 125 generates RAID parity data according to a RAID technique to prevent loss of data to be stored in a hot memory block. If the RAID parity data is generated, RAID controller 125 may store the RAID parity data in a predetermined area of storage device 110.

In some embodiments, RAID controller 125 generates two different units of RAID parity data using data corresponding to a hot page. This may mean that RAID controller 125 uses data to be stored in two different hot pages to generate RAID parity data. For example, to generate RAID parity data, RAID controller 125 may perform an XOR operation on data constituting the same parity stripe. RAID controller 125 may temporarily store a result of the XOR operation in RAID buffer 126.

Afterwards, RAID controller 125 generates RAID parity data by performing an XOR operation on data stored in RAID buffer 126 and data of a hot page constituting another parity stripe. After the RAID parity data is generated, RAID controller 125 may store the RAID parity data in storage device 110 and reset RAID buffer 126. Host interface 127 is used to interface with a host, and NVM interface 128 is used to interface with storage device 110.

Figure 3:
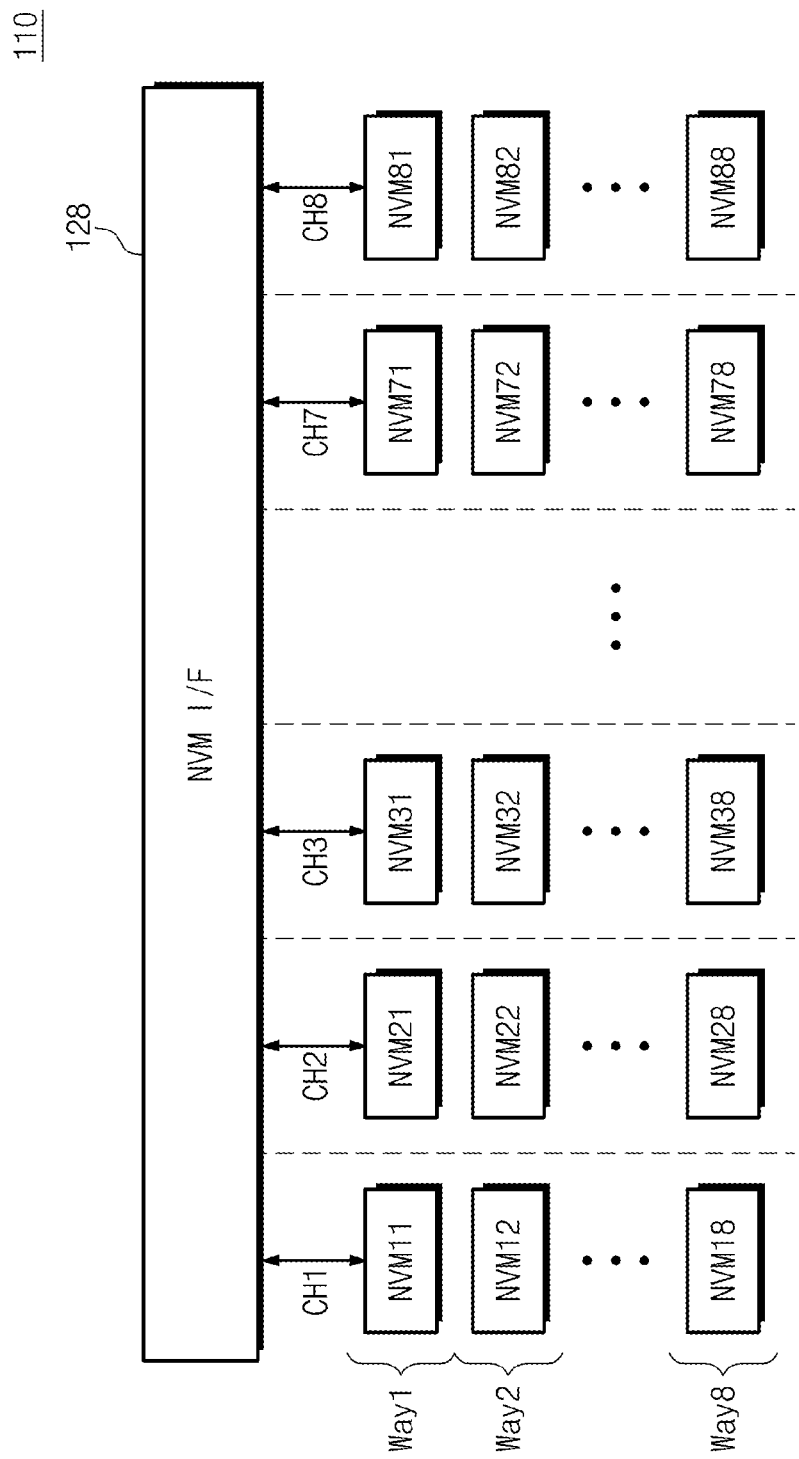
FIG. 3 is a block diagram illustrating a storage device in FIG. 1 according to an embodiment of the inventive concept.

FIG. 3 is a block diagram illustrating an example of storage device 110 in FIG. 1 according to an embodiment of the inventive concept. As described in relation to FIG. 1, storage device 110 in FIG. 1 may be implemented by a nonvolatile memory or by a plurality of nonvolatile memories. FIG. 3 shows an example where storage device 110 is formed of a plurality of nonvolatile memories.

Referring to FIG. 3, storage device 110 comprises a plurality of nonvolatile memories NVM11 to NVM88. Storage device 110 is connected with an NVM interface 128 through a plurality of channels CH1 to CH8. Nonvolatile memories sharing the same channel may receive data from NVM interface 128 through the same channel and transfer read data to NVM interface 128 through the same channel.

For example, nonvolatile memories NVM11 to NVM18 sharing a first channel CH1 may receive data from NVM interface 128 through first channel CH1 and transfer read data to NVM interface 128 through first channel CH1. Nonvolatile memories sharing the same channel may perform a program operation, a read operation, and an erase operation independently.

Data transfer (or, transmitting/receiving) operations of nonvolatile memories sharing a channel may be performed in parallel with data transfer (or, transmitting/receiving) operations of nonvolatile memories sharing another channel. For example, the nonvolatile memories NVM11 to NVM18 sharing first channel CH1 may perform data transfer (or, transmitting/receiving) operations through first channel CH1, and nonvolatile memories NVM21 to NVM28 sharing a second channel CH2 may perform data transfer (or, transmitting/receiving) operations through second channel CH2. In this case, the data transfer (or, transmitting/receiving) operations using first channel CH1 and the data transfer (or, transmitting/receiving) operations using second channel CH2 may be performed in parallel with each other.

Although FIG. 3 shows an example where nonvolatile memories NVM11 to NVM88 are arranged in a matrix of eight channels CH1 to CH8 and eight ways Way1 to Way8, the inventive concept is not limited to this example, and the number of channels and the number of ways can be variously changed.

Figure 4:
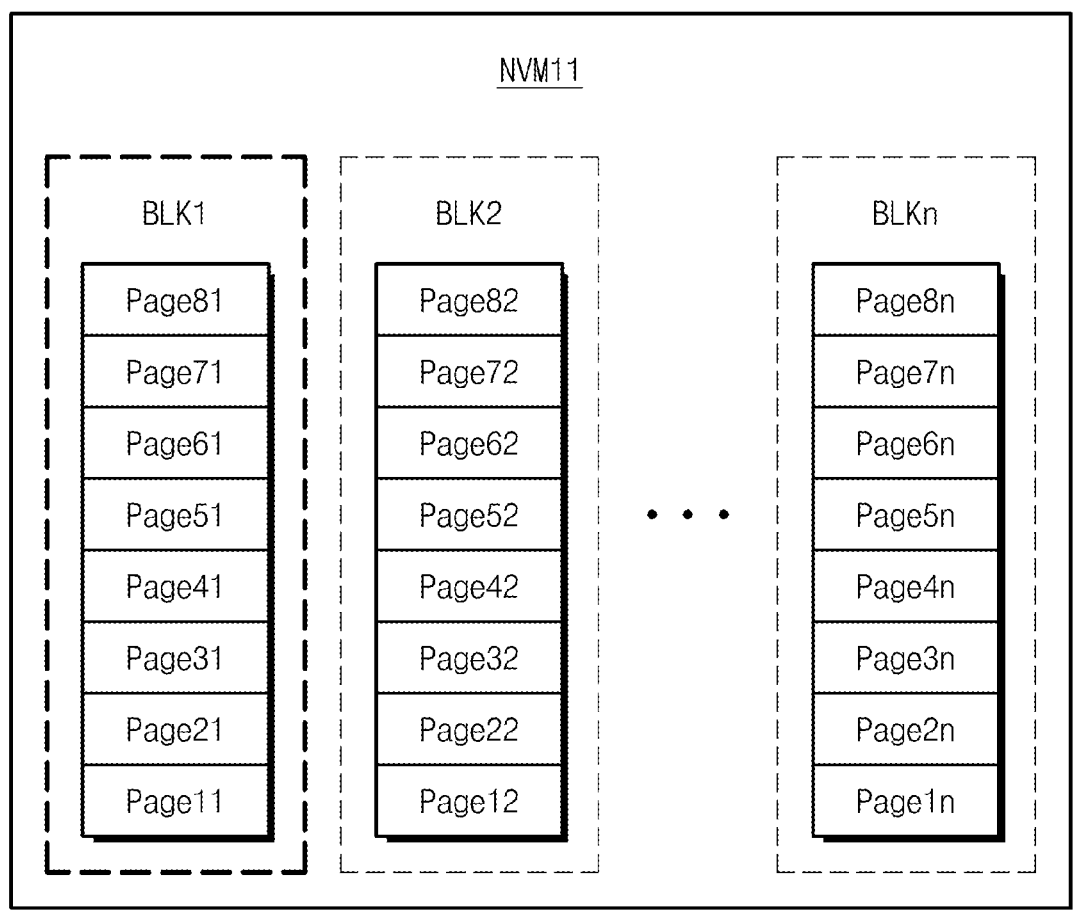
FIG. 4 is a diagram illustrating an example of a nonvolatile memory in FIG. 3.

FIG. 4 is a diagram illustrating an example of nonvolatile memory NVM11 of FIG. 2. Nonvolatile memory NVM11 is placed in a first channel CH1 and a first way Way1. For ease of description, it is assumed that nonvolatile memory NVM11 is a flash memory.

Referring to FIG. 4, nonvolatile memory NVM11 comprises a plurality of memory blocks each comprising a plurality of pages. In the flash memory, a program unit may be different from an erase unit due the flash memory's lack of support for an overwrite operation. For example, a program operation may be performed by a page unit while an erase operation may be performed a memory block unit.

A specific memory block may be frequently erased as compared with other memory blocks. For example, where data stored in a specific memory block is frequently updated, data stored in the specific memory block may be invalidated more frequently than data stored in another memory block. In this case, the specific memory block may be erased more frequently than another memory block.

Because memory cells of a memory block frequently erased may become more deteriorated than memory cells of another memory block, the reliability of the memory block frequently erased may be lowered compared with another memory block. The probability of read failure on data stored in a memory block frequently erased may become higher than that of another memory block.

As illustrated in FIG. 4, where the number of erase operations of a first memory block BLK1 is greater than that of another memory block, first memory block BLK1 may be determined by the controller 120 to be a hot memory block. In some embodiments, processor 121 (refer to FIG. 2) of controller 120 (refer to FIG. 2) counts an erase number of each memory block to determine a memory block having the largest erase number as a hot memory block.

Where read failure on a hot page of hot pages of the hot memory block is generated, data stored in the read failed hot page must be recovered. In general, read failed data may be recovered using ECC. However, an error may not be recovered when an error exceeds ECC coverage, when data associated with a file system is erroneous, when data associated with FTL mapping information is erroneous, and so one.

Memory system 100 uses a RAID technique to prevent loss of data stored in a hot memory block. In particular, memory system 100 may prevent loss of data stored in a hot page by generating a plurality of RAID parity data using data corresponding to a hot page.

Figure 5:
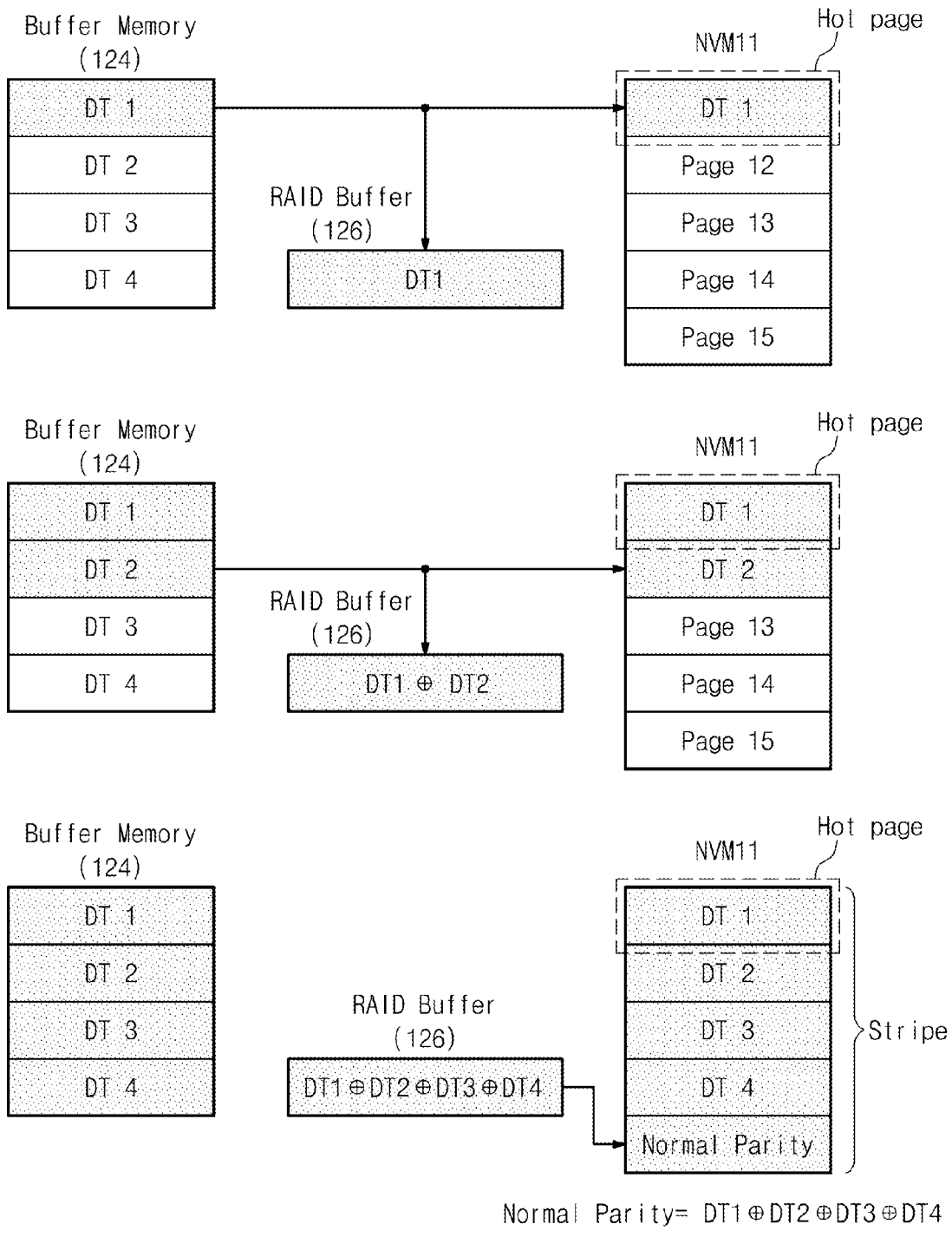
FIG. 5 is a diagram illustrating a method of managing data using a RAID technique.
Figure 6B:
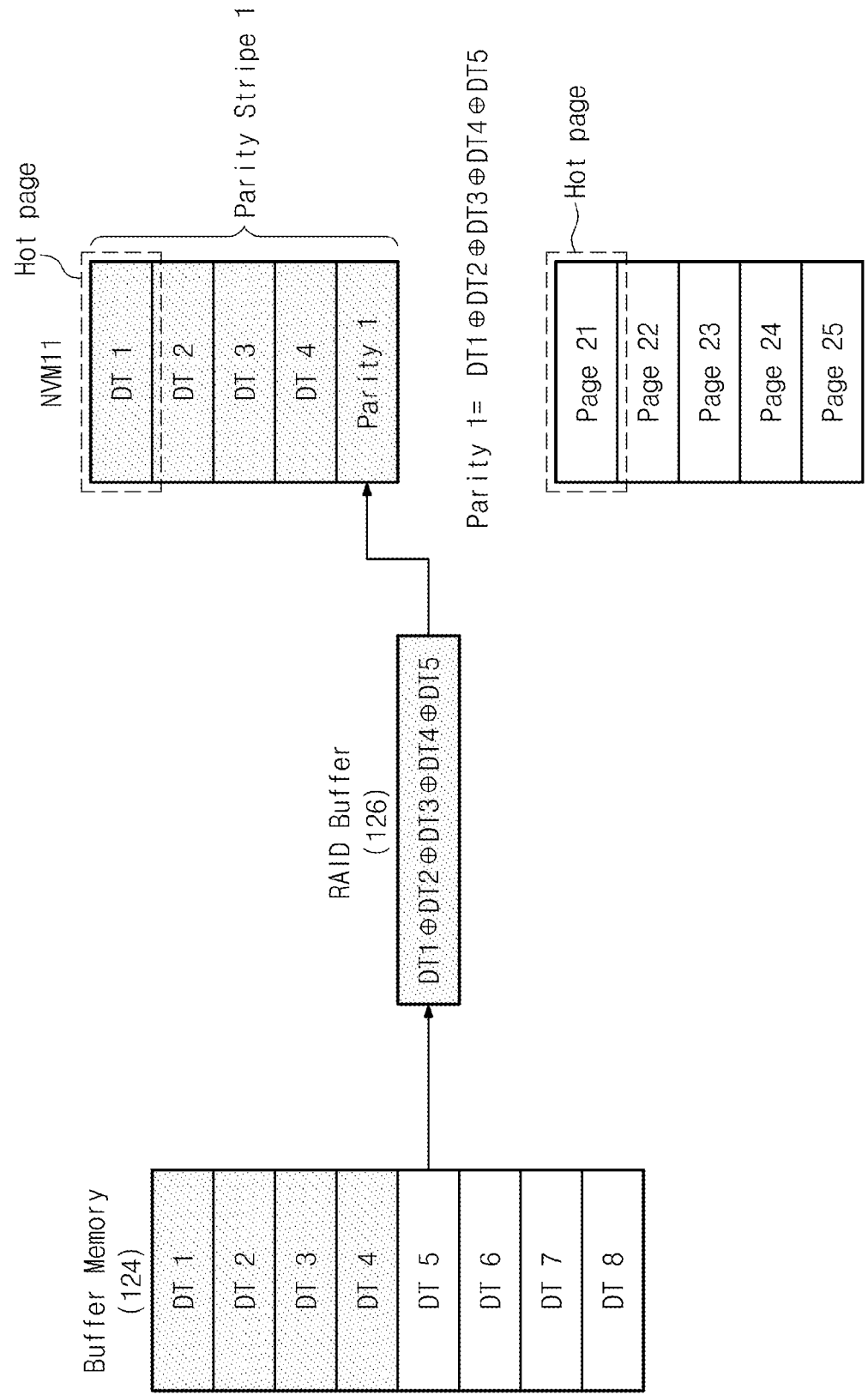

FIG. 5 is a diagram illustrating a method of managing data using a RAID technique. FIGS. 6A and 6B are diagrams illustrating a method of generating RAID parity data according to an embodiment of the inventive concept. FIG. 7 is a diagram illustrating a method of recovering data according to an embodiment of the inventive concept. As will be described in relation to FIGS. 5 through 7, it is possible to improve the reliability of data stored in a hot page by generating a plurality of RAID parity data using data corresponding to the hot page.

FIG. 5 is a diagram illustrating a method in which normal parity data is generated using a typical RAID technique. For ease of description, it is assumed that a stripe is formed of four units of user data and one unit of RAID parity data. Also, it is assumed that a stripe of data is stored in first pages Page11, Page12, Page13, Page14, and Page15 of first to fifth blocks BLK1 to BLK5 (refer to FIG. 4), respectively.

Referring to FIG. 5, first user data DT1 stored in a buffer memory 124 is programmed in page Page11 of first block BLK1 of nonvolatile memory NVM11, and first user data DT1 is transferred to a RAID buffer 126.

Then, second user data DT2 stored in buffer memory 124 is programmed in page Page12 of second block BLK2 of nonvolatile memory NVM11. An XOR operation is performed with respect to second user data DT2 and first user data DT1, and a result of the XOR operation is stored in RAID buffer 126.

Third user data DT3 and fourth user data DT4 are stored in page Page13 of third block BLK3 and page Page14 of fourth block BLK4, respectively. A result of an XOR operation on first to fourth user data DT1 to DT4 is stored in RAID buffer 126. A result of the XOR operation on first to fourth user data DT1 to DT4 may be normal parity data. Afterwards, a value (i.e., the normal parity data) stored in RAID buffer 126 is stored in page Page15 of fifth block BLK5.

In the above technique, if read failure occurs with respect to one unit of data in a stripe, the read failed data may be recovered by the RAID technique. On the other hand, if read failure occurs with respect to two units of data in a stripe, the read failed data may not be recovered by the RAID technique. As an example, as illustrated in FIG. 5, if first user data DT1 is stored in a hot page, the probability that read failure on two or more data including first user data DT1 is generated may be high. As described above, it is impossible to recover two data read failed.

FIGS. 6A to 6D are diagrams illustrating a method of generating RAID parity data according to an embodiment of the inventive concept. In this method, RAID parity data is generated using data corresponding to two different hot pages. Also, data corresponding to one hot page is used to generate two different units of RAID parity data. In contrast to the example of FIG. 5, even where a read failure occurs at two units of data in a stripe, read failed data may be recovered.

For ease of description, in FIGS. 6A to 6D, it is assumed that a first parity stripe is formed of first to fourth user data DT1 to DT4 and first RAID parity data Parity 1. Also, it is assumed that the first to fourth user data DT1 to DT4 and first RAID parity data Parity 1 are programmed in pages Page11 to Page15 in FIG. 4, respectively. It is further assumed that a second parity stripe is formed of fifth to eighth user data DT5 to DT8 and second RAID parity data Parity 2. Also, it is assumed that the fifth to eighth user data DT5 to DT8 and second RAID parity data Parity 2 are programmed in pages Page21 to Page25 in FIG. 4, respectively.

As illustrated in FIG. 4, it is assumed that first block BLK1 is a hot memory block and all pages Page11 to Page81 in first block BLK1 are hot pages. Also, it is assumed that first user data DT1 and second user data DT2 are stored in a first hot page Page11 and a second hot page Page21, respectively.

Referring to FIG. 6A, first user data DT1 stored in buffer memory 124 is programmed in page Page11 of nonvolatile memory NVM11. At this time, buffer controller 123 (refer to FIG. 2) sends first user data DT1 to RAID controller 125 (refer to FIG. 2), and RAID controller 125 temporarily stores first user data DT1 in a RAID buffer 126.

Then, the second user data DT2 stored in buffer memory 124 is programmed in page Page12 of nonvolatile memory NVM11. At this time, buffer controller 123 transfers second user data DT2 to RAID controller 125, and RAID controller 125 performs an XOR operation on first user data DT1 and second user data DT2. RAID controller 125 stores a result of the XOR operation in RAID buffer 126.

Third user data DT3 and fourth user data DT4 are stored in page Page13 of third block BLK3 and page Page14 of fourth block BLK4, respectively. A result of an XOR operation on first to fourth user data DT1 to DT4 is stored in RAID buffer 126.

Referring to FIG. 6B, RAID controller 125 performs an XOR operation on a result of the XOR operation on first to fourth user data DT1 to DT4 and fifth user data DT5, and it stores a result of the XOR operation in RAID buffer 126. That is, RAID controller 125 may perform an XOR operation on first to fifth user data DT1 to DT5 and store a result of the XOR operation in RAID buffer 126. The result of the XOR operation on first to fifth user data DT1 to DT5 may be referred to as first RAID parity data Parity 1, and first RAID parity data Parity 1 may be stored in page Page15 of the nonvolatile memory NVM11.

Below, an operation of generating second RAID parity data Parity 2 is described with reference to FIGS. 6C and 6D.

Figure 6C:
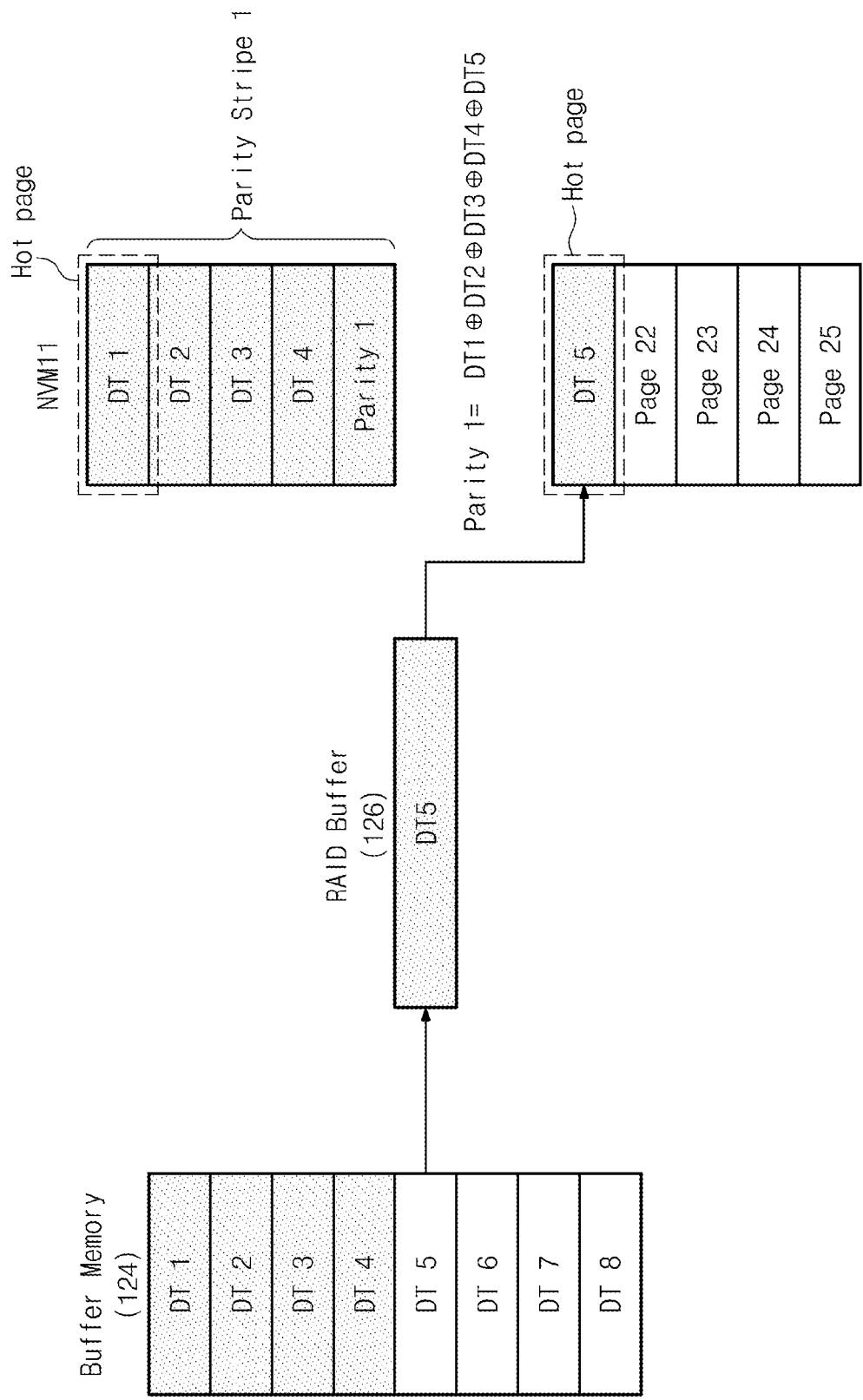
Figure 7:
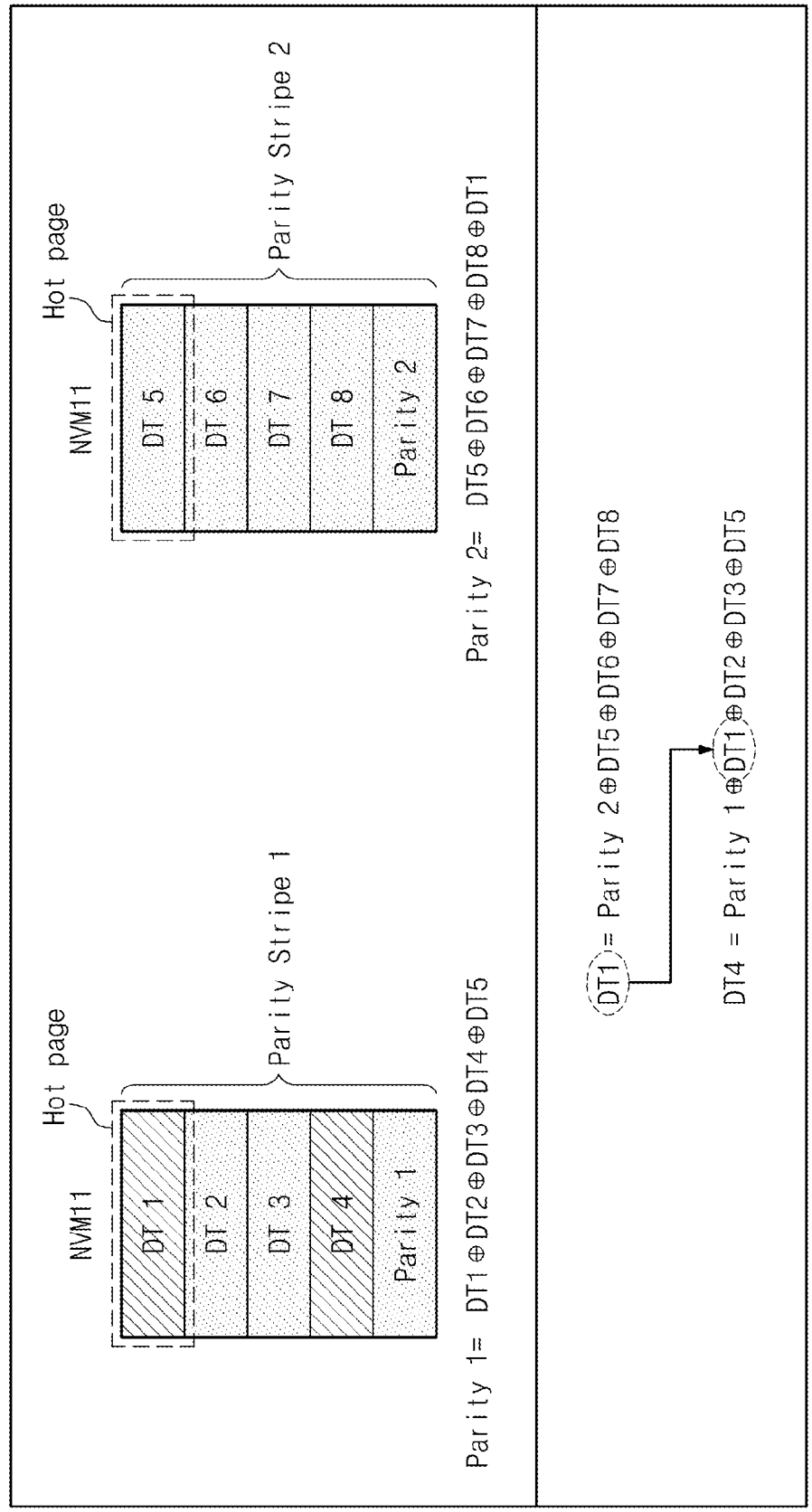
FIG. 7 is a diagram illustrating a method of recovering data according to an embodiment of the inventive concept.

Referring to FIG. 6C, fifth to eighth user data DT5 to DT8 stored in buffer memory 124 is sequentially stored in pages Page21 to Page25, respectively. RAID controller 125 sequentially performs an XOR operation on fifth to eighth user data DT5 to DT8. A result of the XOR operation on fifth to eighth user data DT5 to DT8 is stored in RAID buffer 126.

Figure 6D:
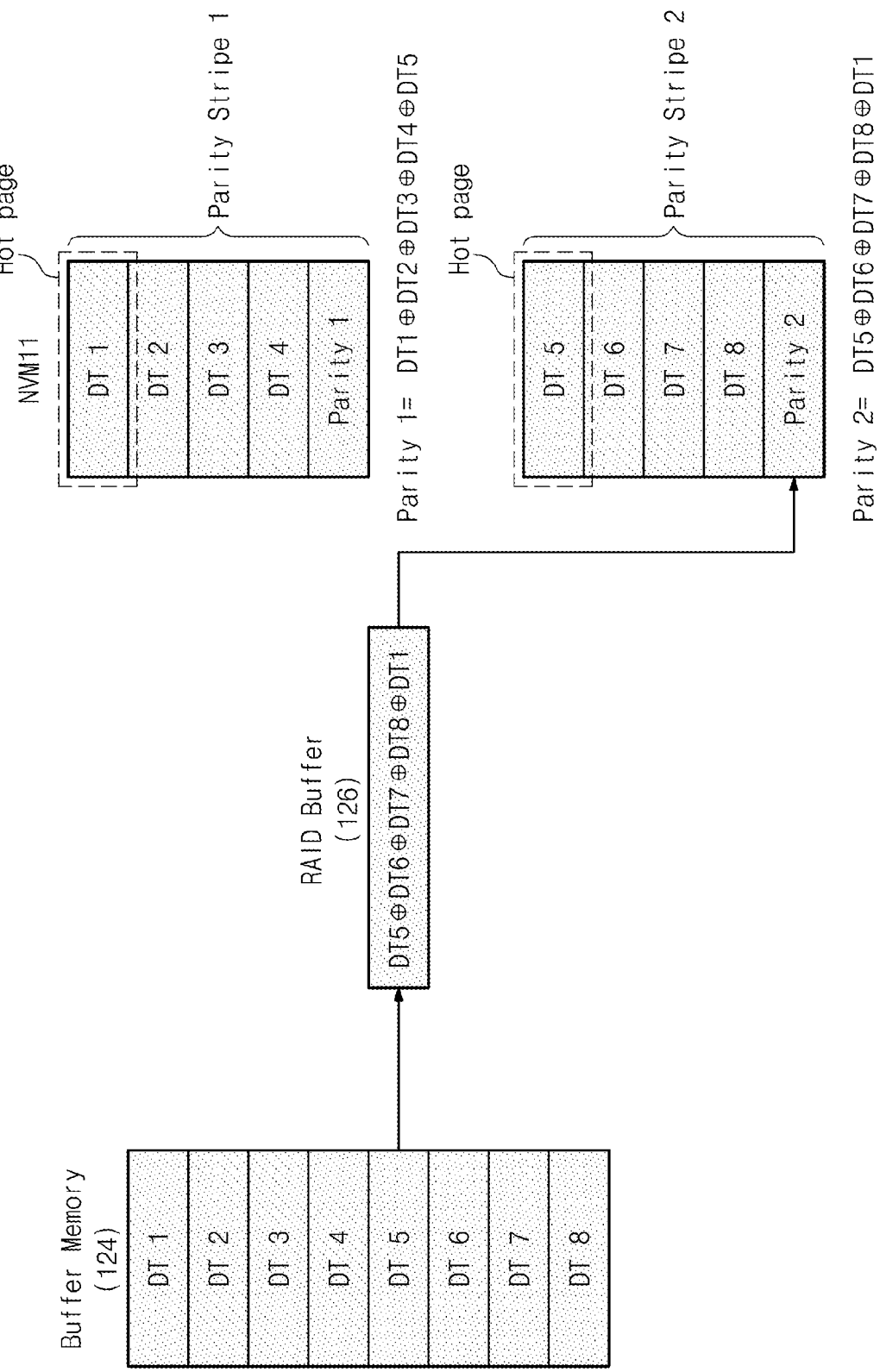

Referring to FIG. 6D, RAID controller 125 performs an XOR operation on the result of the XOR operation on fifth to eighth user data DT5 to DT8 and first user data DT1 to store a result of the XOR operation in RAID buffer 126. Herein, the result of the XOR operation on fifth to eighth user data DT5 to DT8 and first user data DT1 is referred to as second RAID parity data Parity 2, and the second RAID parity data is stored in page Page25 of nonvolatile memory NVM11.

In the above described example, first RAID parity data Parity 1 may be a first parity stripe and second RAID parity data Parity 2 may be a second parity stripe. First RAID parity data Parity 1 may be generated using first user data DT1 of the first parity stripe and the fifth user data DT5 of the second parity stripe. That is, first RAID parity data Parity 1 may be generated using data to be stored in two hot pages in different parity stripes.

Second RAID parity data Parity 2 is generated using first user data DT1 of the first parity stripe and fifth user data DT5 of the second parity stripe. That is, second RAID parity data Parity 2 is generated using data to be stored in two hot pages in different parity stripes.

First user data DT1 corresponding to first hot page Page11 is used to generate first and second RAID parity data Parity 1 and Parity 2. Likewise, fifth user data DT5 corresponding to second hot page Page21 is used to generate first and second RAID parity data Parity 1 and Parity 2.

FIG. 7 is a diagram illustrating an operation in which read failed data is recovered. The operation of FIG. 7 recovers read failed data when two user data of data in a parity stripe are read failed. For ease of description, it is assumed that first RAID parity data Parity 1 and second RAID parity data Parity 2 are generated according a manner described with reference to FIGS. 6A to 6D. Also, it is assumed that read failure occurs in first and fourth user data DT1 and DT4 of a first parity stripe. In the RAID technique described with reference to FIG. 5, if read failure occurs with respect to two units of data in a stripe, read failed data may not be recovered. In the example of FIG. 7, however, because one hot page is used to generate different RAID parity data, read failed data may be recovered.

Referring to FIG. 7, first user data DT1 is recovered to recover first user data DT1 and fourth user data DT4. Because first user data DT1 is used to generate both the first RAID parity data Parity 1 and second RAID parity data Parity 2, it may be recovered using second RAID parity data Parity 2.

First, as illustrated in FIG. 7, first user data DT1 is recovered using second RAID parity data Parity 2. Thereafter, a recover operation is performed for fourth user data DT4. Because first user data DT1 is recovered, fourth user data DT4 may be recovered using first RAID parity data Parity 1. That is, as illustrated in FIG. 7, fourth user data DT4 may be recovered using first user data DT1 recovered and first RAID parity data Parity 1.

The inventive concept is not limited to examples described in FIGS. 6 and 7. For example, in FIGS. 6 and 7, a parity stripe was assumed to be formed of four units of user data and one unit of RAID parity data. However, a parity stripe may be variously changed. Also, in FIGS. 6 and 7, user data of one parity stripe was assumed to be stored in the same nonvolatile memory. However, the inventive concept is not limited thereto. For example, user data of a parity stripe may be different nonvolatile memories (refer to FIG. 3).

In FIGS. 6 and 7, there was described an example in which two RAID parity data is generated and read failed data is recovered using two RAID parity data. However, the inventive concept is not limited thereto. For example, three or more RAID parity data may be generated, and read failed data is recovered using the three or more RAID parity data. This will be described with reference to FIGS. 8 and 9.

Figure 8:
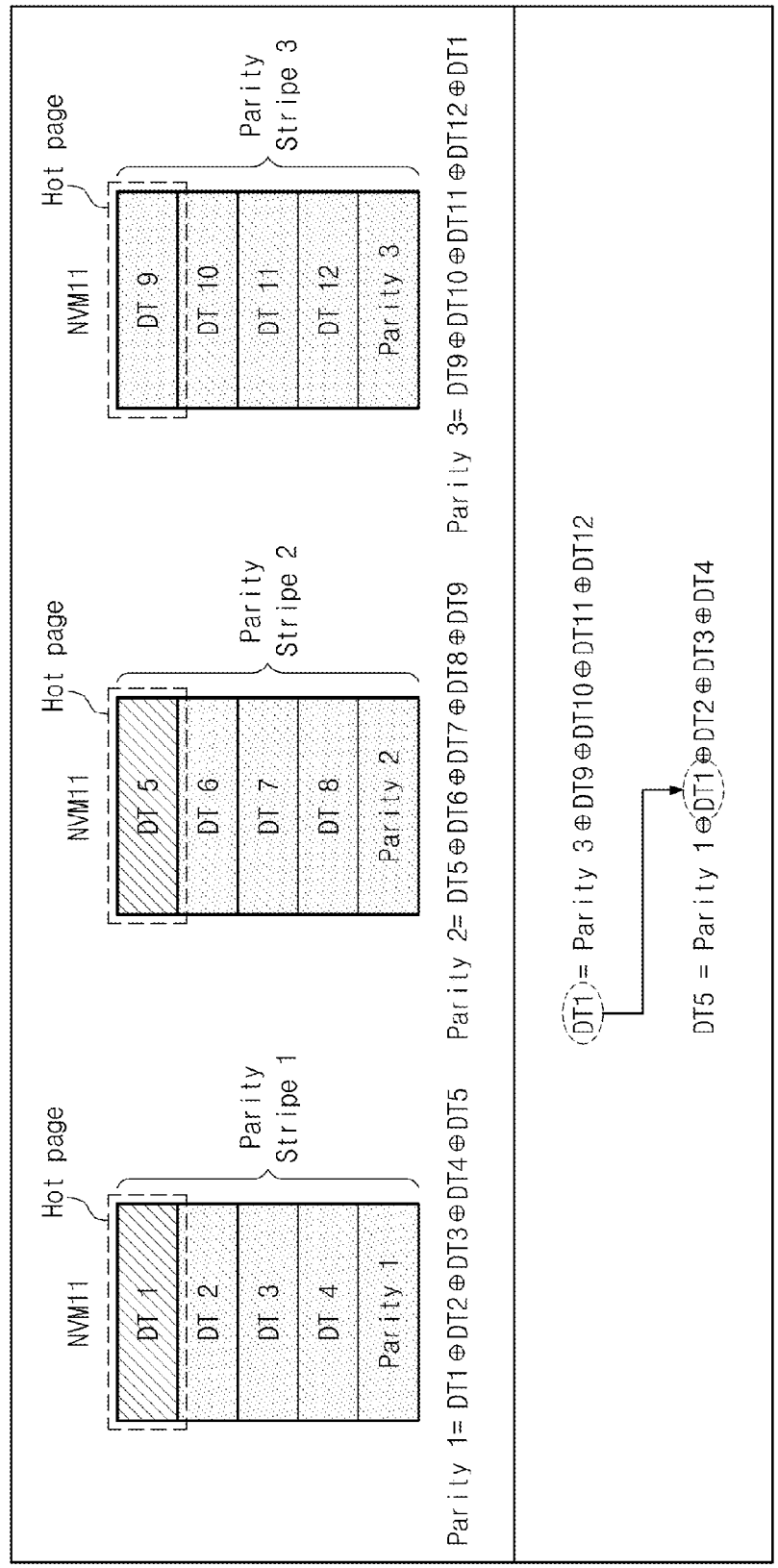
FIG. 8 is a diagram illustrating a method of recovering data according to another embodiment of the inventive concept.

FIG. 8 is a diagram illustrating another embodiment of the inventive concept. In FIG. 8, there is illustrated an example in which read failed data is recovered when read failure occurs in user data respectively corresponding to two hot pages. For ease of description, it is assumed that first to third RAID parity data is generated. Also, it is assumed that first to fourth user data DT1 to DT4 is stored in pages Page11 to Page14 of a nonvolatile memory NVM11 (refer to FIG. 4), fifth to eighth user data DT5 to DT8 is stored in pages Page21 to Page24 of nonvolatile memory NVM11, and ninth to twelfth user data DT9 to DT12 is stored in pages Page13 to Page34 of nonvolatile NVM11.

Referring to FIG. 8, first RAID parity data Parity 1 is generated by XORing first to fifth user data DT1 to DT5. That is, first RAID parity data Parity 1 may be generated using first user data DT1 corresponding to a first hot page Page11 and fifth user data DT5 corresponding to a second hot page Page21. In this case, fifth user data DT5 may belong to a second parity stripe and be used to generate second RAID parity data Parity 2.

Second RAID parity data Parity 2 is generated by XORing the fifth to ninth user data DT5 to DT9. That is, second RAID parity data Parity 2 may be generated using fifth user data DT5 corresponding to second hot page Page21 and ninth user data DT9 corresponding to a third hot page Page31. In this case, ninth user data DT9 may belong to a third parity stripe and be used to generate third RAID parity data Parity 3.

Third RAID parity data Parity 3 may be generated by XORing ninth to twelfth user data DT9 to DT12. That is, third RAID parity data Parity 3 may be generated using ninth user data DT9 corresponding to third hot page Page31 and first user data DT1 corresponding to first hot page Page11. In this case, first user data DT1 may belong to the first parity stripe and be used to generate the first RAID parity data Parity 1.

As illustrated in FIG. 8, each of first to third RAID parity data Parity 1 to Parity 3 may be generated using data of two different hot pages. Also, data corresponding to one page may be used to generate two different units of RAID parity data. Because user data corresponding to a hot page is used to generate two different units of RAID parity data, it may be maintained until RAID parity data corresponding to the user data is generated. For example, because first user data DT1 is used to generate first and third RAID parity data Parity 1 and Parity 3, it may be maintained in a buffer memory 124 (refer to FIG. 2) until third RAID parity data Parity 3 is generated.

As indicated by the foregoing, although a read failure occurs for user data corresponding to two hot pages, memory system 100 may recover read failed user data corresponding to two hot pages. For example, it is assumed that first user data DT1 and fifth user data DT5 are read failed. In this case, because first user data DT1 is used to generate third RAID parity data Parity 3, it may be recovered using the third RAID parity data. Parity 3. Also, because fifth user data DT5 is used to generate first RAID parity data Parity 1, it may be recovered using first RAID parity data Parity 1 and first user data DT1. As a result, although a read failure occurs for user data corresponding to two hot pages, memory system 100 according to an embodiment of the inventive concept may successfully recover read failed user data corresponding to two hot pages.

Figure 9:
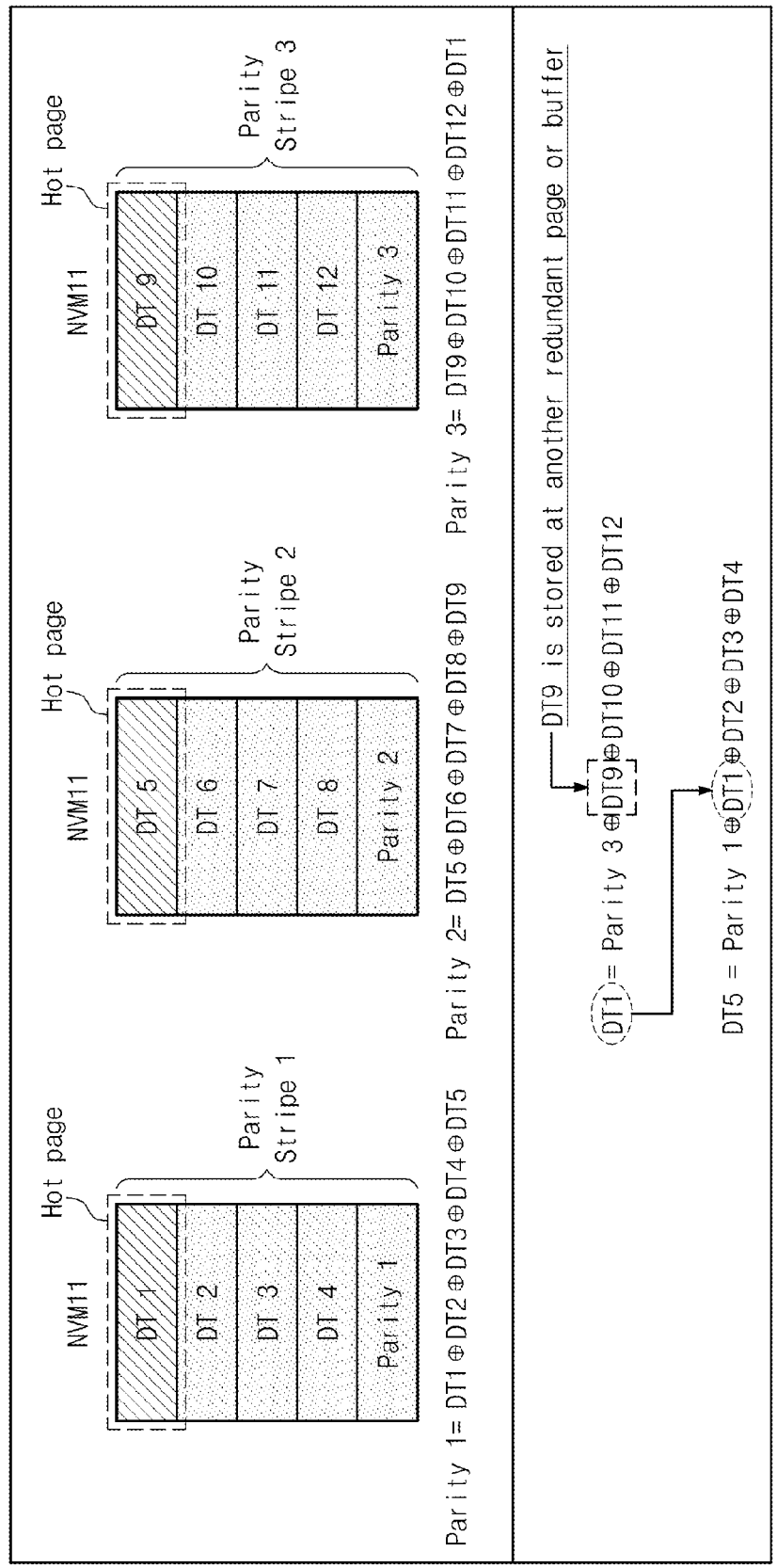
FIG. 9 is a diagram illustrating a method of recovering data according to still another embodiment of the inventive concept.

FIG. 9 is a diagram illustrating still another embodiment of the inventive concept. In FIG. 9, there is illustrated an example in which read failed data is recovered when read failure occurs in user data corresponding to all hot pages.

For ease of description, it is assumed that first to third RAID parity data Parity 1 to Parity 3 is generated. Also, it is assumed that read failure occurs in user data corresponding to all hot pages. For example, it is assumed that read failure occurs in first, fifth, and ninth user data DT1, DT5, and DT9. Any one of first, fifth, and ninth user data DT1, DT5, and DT9 may be stored to recover first, fifth, and ninth user data DT1, DT5, and DT9. To cope with a case in which all hot pages are read failed, memory system 100 may store one of a plurality of hot pages in one of a plurality of nonvolatile memories (refer to FIG. 3). For example, where ninth user data DT9 is stored in a nonvolatile memory, memory system 100 may recover first and fifth user data DT1 and DT5 as illustrated in FIG. 9. First and fifth user data DT1 and DT5 may be recovered the same as that described in FIG. 8, and a description thereof is thus omitted.

Figure 10:
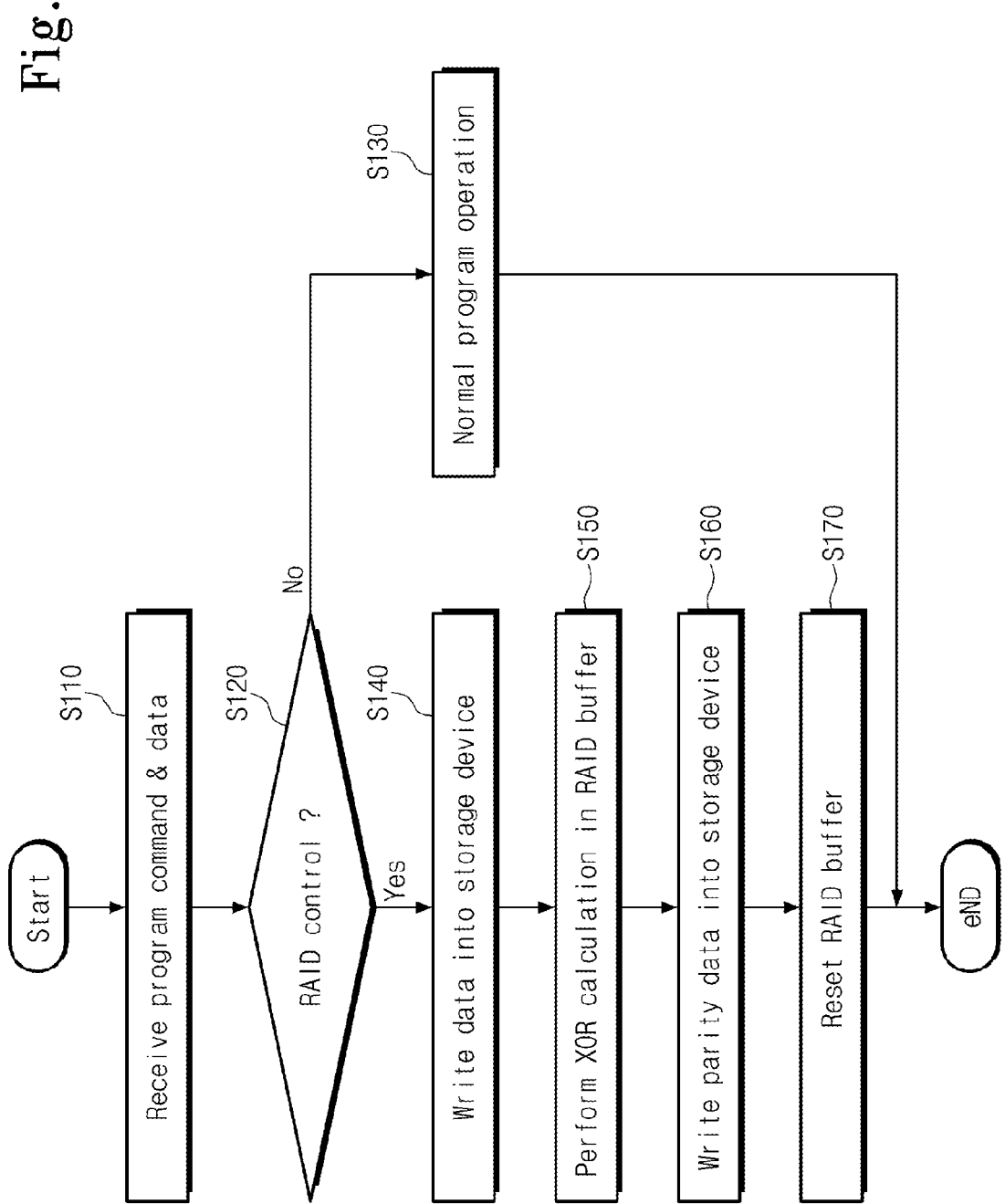
FIG. 10 is a flow chart illustrating a data managing method according to an embodiment of the inventive concept.

FIG. 10 is a flow chart illustrating a data managing method according to an embodiment of the inventive concept.

Referring to FIG. 10, in operation S110, controller 120 receives a program command and data from a host. The received data is temporarily stored in a buffer memory 124. Thereafter, in operation S120, controller 120 determines whether to perform the RAID scheme described above in accordance with various embodiments of the inventive concept. For example, if a logical address (or, a physical address) corresponding to data to be programmed corresponds to a hot memory block, the RAID scheme may be applied. If the RAID scheme is determined not to be needed, in operation S130, controller 120 may perform a normal program operation. Otherwise, if the RAID scheme according is determined to be needed, controller 120 may perform the following data managing operation using the RAID scheme according to an embodiment of the inventive concept.

In operation S140, data may be written in storage device 110 (refer to FIG. 1). That is, as described with reference to FIGS. 6A to 6D, data stored in buffer memory 124 may be programmed in storage device 110. In this case, data may be programmed in the same nonvolatile memory of storage device 110, or may be programmed in different nonvolatile memories of storage device 110 (refer to FIG. 3). The data stored in buffer memory 124 is transferred to a RAID buffer 126 (refer to FIG. 2) before or after a program operation is performed.

In operation S150, an XOR operation is performed on data stored in RAID buffer 126. That is, as described with reference to FIGS. 6A to 6D, a RAID controller 125 (refer to FIG. 2) may generate RAID parity data by performing an XOR operation on data stored in RAID buffer 126. Under these circumstances, RAID controller 125 generates one RAID parity data using data corresponding to two different hot pages, and performs an XOR operation until generation of RAID parity data is completed. Afterwards, in operation S170, controller 120 resets RAID buffer 126.

As indicated by the foregoing, a memory system according to an embodiment of the inventive concept may prevent data loss using the RAID technique. In particular, the memory system may generate different RAID parity data using data to be stored in one hot page to protect the reliability of data in a hot memory block. Thus, it is possible to prevent data stored in a hot page from being lost.

The embodiments described with reference to FIGS. 1 to 10 are merely examples, and the inventive concept is not limited thereto. For example, in FIGS. 1 to 10, a memory block experiencing more erase operations than other memory blocks may be set to a hot memory block. The inventive concept can also be applied to a three-dimensional memory. In the three-dimensional memory, data of memory cells adjacent to a common source line may be easily damaged by particularity of a fabrication process. In this case, a hot memory block may be defined by memory cells adjacent to the common source line. Below, there will be described an embodiment in which the inventive concept is applied to the three-dimensional memory.

Figure 11:
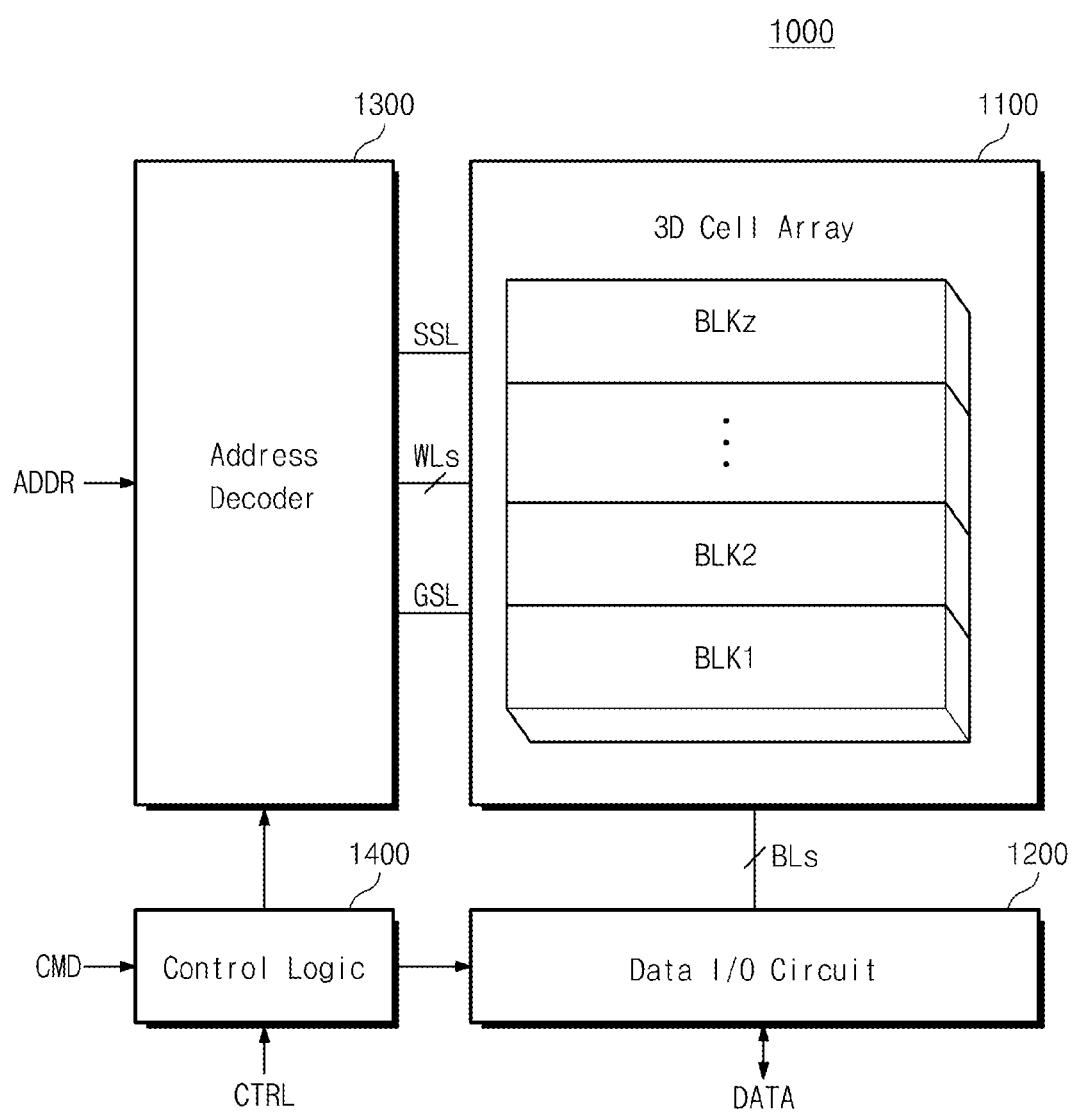
FIG. 11 is a block diagram illustrating a flash memory according to an embodiment of the inventive concept.

FIG. 11 is a block diagram illustrating a flash memory 1000 according to an embodiment of the inventive concept.

Referring to FIG. 11, flash memory 1000 comprises a three-dimensional (3D) cell array 1100, a data input/output circuit 1200, an address decoder 1300, and control logic 1400.

3D cell array 1100 comprises a plurality of memory blocks BLK1 to BLKz, each of which is formed to have a three-dimensional structure (or, a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of flash memory 1000.

Data input/output circuit 1200 is connected with the 3D cell array 1100 via a plurality of bit lines. Data input/output circuit 1200 receives data from an external device or outputs data read from the 3D cell array 1100 to the external device. Address decoder 1300 is connected with the 3D cell array 1100 via a plurality of word lines and selection lines GSL and SSL. Address decoder 1300 selects the word lines in response to an address ADDR.

Control logic 1400 controls programming, erasing, reading, etc. of flash memory 1000. For example, in programming, control logic 1400 may control address decoder 1300 such that a program voltage is supplied to a selected word line, and may control data input/output circuit 1200 such that data is programmed.

Figure 12:
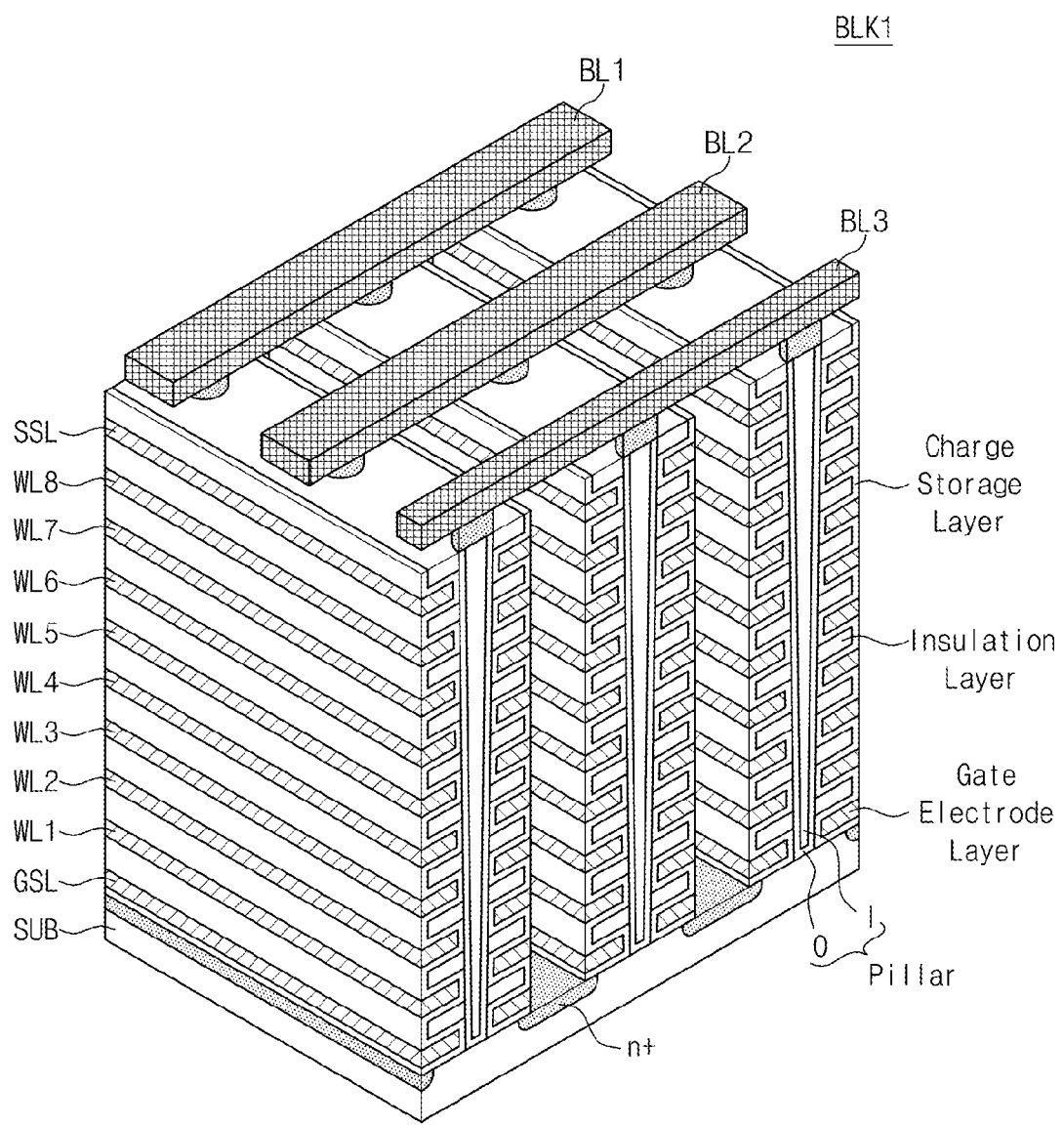
FIG. 12 is a perspective view illustrating a 3D structure of a memory block illustrated in FIG. 11.

FIG. 12 is a perspective view illustrating a 3D structure of a memory block illustrated in FIG. 11.

Referring to FIG. 12, a memory block BLK1 is formed in a direction perpendicular to a substrate SUB. An n+ doping region is formed in the substrate SUB. A gate electrode layer and an insulation layer are deposited on the substrate SUB in turn. A charge storage layer is formed between the gate electrode layer and the insulation layer.

If the gate electrode layer and the insulation layer are patterned in a vertical direction, a V-shaped pillar may be formed. The pillar is connected with substrate SUB via the gate electrode layer and the insulation layer. An outer portion O of the pillar is formed of a channel semiconductor, and an inner portion I thereof is formed of an insulation material such as silicon oxide.

The gate electrode layer of the memory block BLK1 is connected with a ground selection line GSL, a plurality of word lines WL1 to WL8, and a string selection line SSL. The pillar of memory block BLK1 is connected with a plurality of bit lines BL1 to BL3. In FIG. 12, there is illustrated the case that one memory block BLK1 has two selection lines SSL and GSL, eight word lines WL1 to WL8, and three bit lines BL1 to BL3. However, the inventive concept is not limited thereto.

Figure 13:
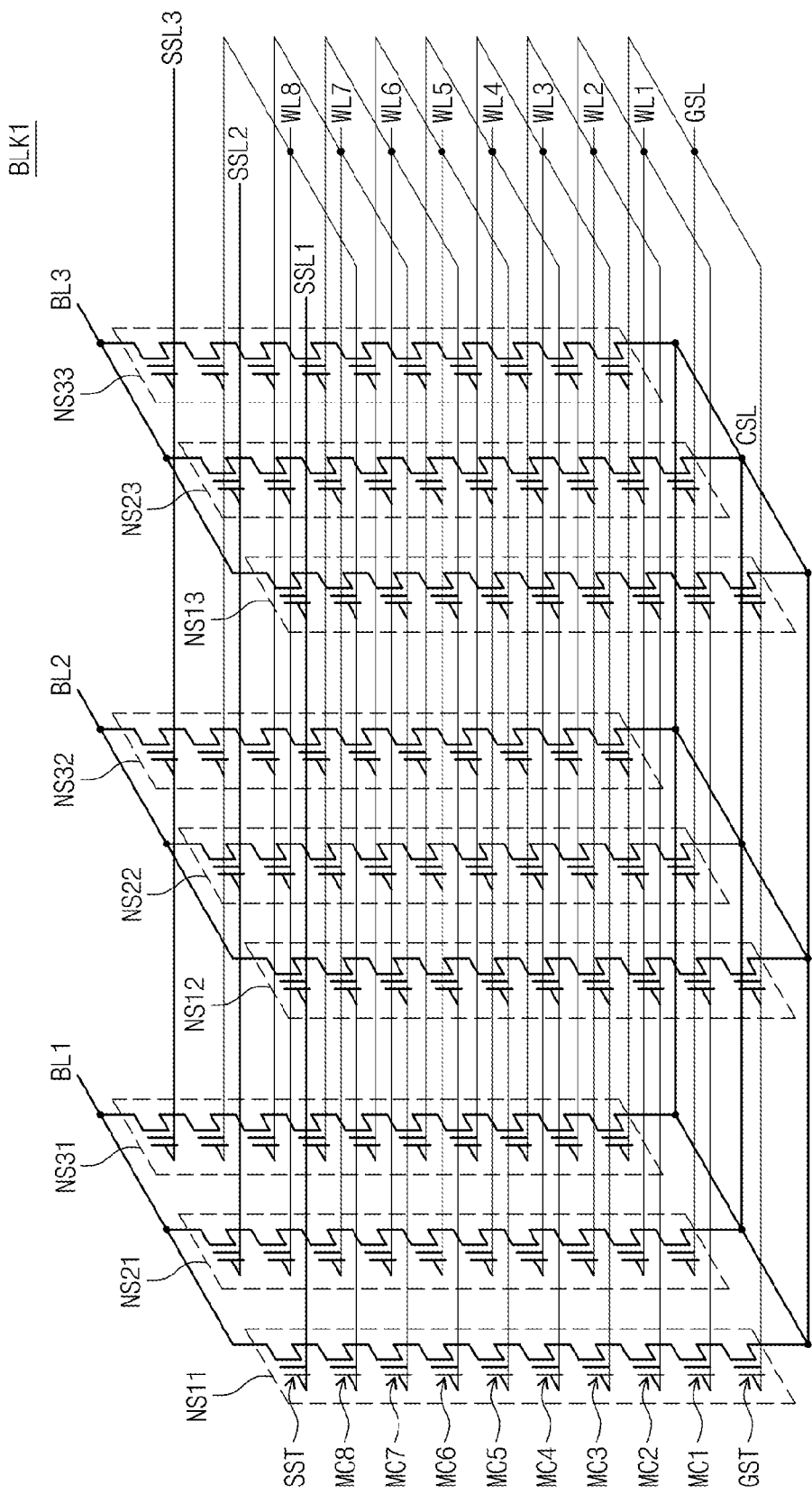
FIG. 13 is a circuit diagram illustrating an equivalent circuit of a memory block illustrated in FIG. 12.

FIG. 13 is a circuit diagram illustrating an equivalent circuit of a memory block illustrated in FIG. 12.

Referring to FIG. 13, NAND strings NS11 to NS33 are connected between bit lines BL1 to BL3 and a common source line CSL. Each NAND string (e.g., NS11) comprises a string selection transistor SST, a plurality of memory cells MC1 to MC8, and a ground selection transistor GST.

String selection transistors SST are connected with string selection lines SSL1 to SSL3. Memory cells MC1 to MC8 are connected with corresponding word lines WL1 to WL8, respectively. Ground selection transistors GST are connected with ground selection line GSL. A string selection transistor SST is connected with a bit line and a ground selection transistor GST is connected with a common source line CSL.

Word lines (e.g., WL1) having the same height are connected in common, and string selection lines SSL1 to SSL3 are separated from one another. During programming of memory cells (constituting a page) connected with a first word line WL1 and included in NAND strings NS11, NS12, and NS13, a first word line WL1 and a first string selection line SSL1 may be selected.

In a three-dimensional memory block, a diameter of a pillar may decrease toward a common source line CSL. This may mean that a read error on memory cells adjacent to common source line CSL is generated to be easier than that on memory cells adjacent to a string selection line SSL.

In some embodiments, memory cells adjacent to common source line CSL may be designated by the controller 120 to form hot pages. For example, in the example of FIGS. 12 and 13, memory cells sharing a first word line WL1 may be designated by the controller 120 to form hot pages. In this case, data corresponding to hot pages may be managed by the RAID scheme described with reference to FIGS. 1 to 10. Thus, it is possible to prevent data stored in hot pages from being damaged.

For example, referring to FIGS. 12 and 13, memory cells immediately adjacent to common source line CSL may share first word line WL1. This may mean that memory cells sharing first word line WL1 correspond to a pillar having the smallest diameter. In this case, memory cells sharing first word line WL1 and corresponding to a first string selection line SSL1 may be set by the controller 120 to a first hot page, and memory cells sharing first word line WL1 and corresponding to a second string selection line SSL2 may be set by the controller 120 to a second hot page. Likewise, memory cells sharing first word line WL1 and corresponding to an nth string selection line SSLn may be set by the controller 120 to an nth hot page.

In this case, data corresponding to hot pages may be managed using the RAID technique described with reference to FIGS. 1 to 10. For example, data of a first hot page may be used to generate at least two units of RAID parity data. Likewise, data of a second hot page may be used to generate at least two RAID parity data. Thus, it is possible to prevent data stored in hot pages from being damaged.

In the examples of FIGS. 12 and 13, RAID parity data may be generated in a variety of manners. For example, one RAID parity data may be generated using two different hot pages and a plurality of normal pages. Herein, the normal page may be a page corresponding to another word line except for first word line WL1. In this case, normal pages constituting one RAID parity data may correspond to different word lines, respectively. That is, normal pages constituting one RAID parity data may correspond to pillars having different diameters and may be identified by the memory controller 120.

Figure 14:
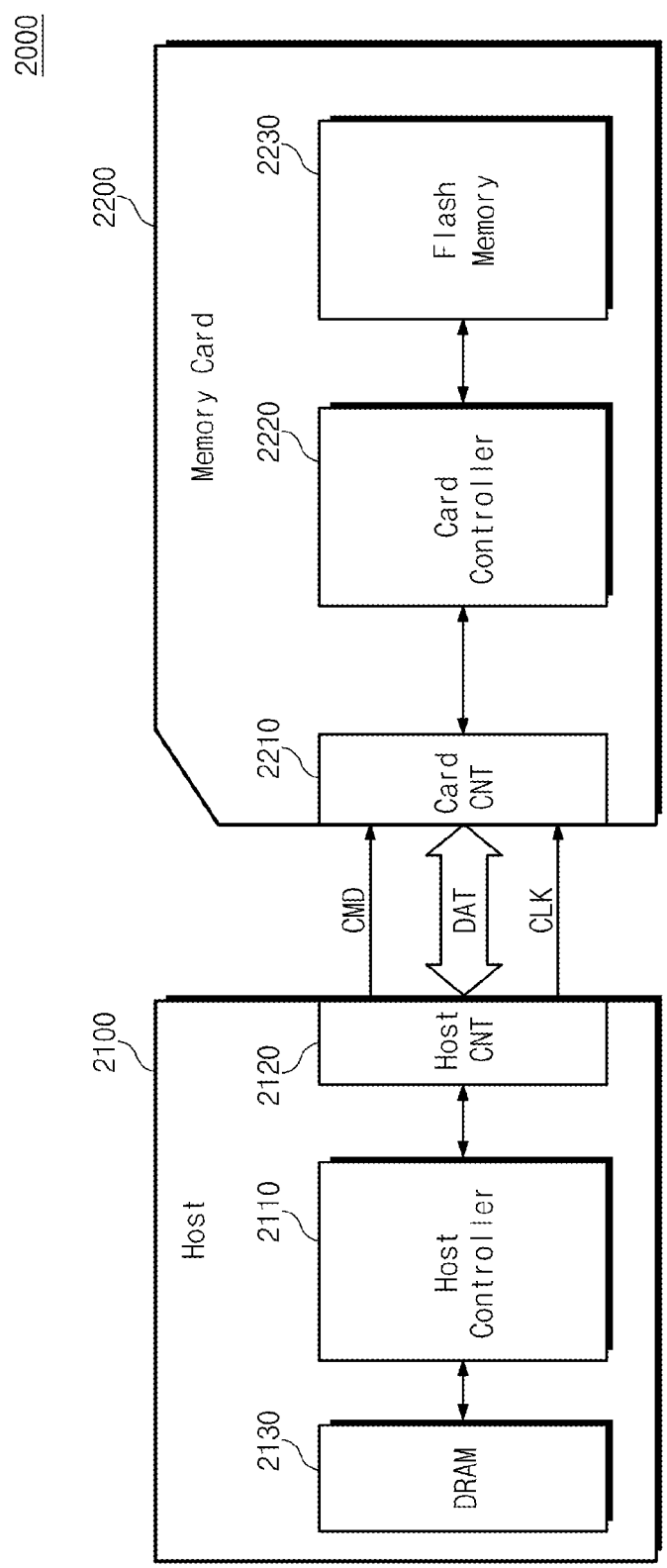
FIG. 14 is a block diagram illustrating a memory card system comprising a nonvolatile memory according to an embodiment of the inventive concept.

FIG. 14 is a block diagram illustrating a memory card system 2000 comprising a nonvolatile memory according to an embodiment of the inventive concept.

Referring to FIG. 14, memory card system 2000 comprises a host 2100 and a memory card 2200. Host 2100 comprises a host controller 2110, a host connection unit 2120, and a DRAM 2130.

Host 2100 writes data in memory card 2200 and reads data from memory card 2200. Host controller 2110 sends a command (e.g., a write command), a clock signal CLK generated from a clock generator (not shown) in host 2100, and data to memory card 2200 via host connection unit 2120. DRAM 2130 may be a main memory of host 2100.

Memory card 2200 comprises a card connection unit 2210, a card controller 2220, and a flash memory 2230. Card controller 2220 stores data in flash memory 2230 in response to a command input via card connection unit 2210. The data may be stored in synchronization with a clock signal generated from a clock generator (not shown) in card controller 2220. Flash memory 2230 stores data transferred from host 2100. For example, where host 2100 is a digital camera, flash memory 2230 may store image data.

Memory card system 2000, as described above, may prevent data loss using the RAID technique. In particular, memory card system 2000 may generate a plurality of different units of RAID parity data using data to be stored in one hot page to protect the reliability of data in a hot memory block. Thus, it is possible to prevent data stored in a hot page from being damaged.

Figure 15:
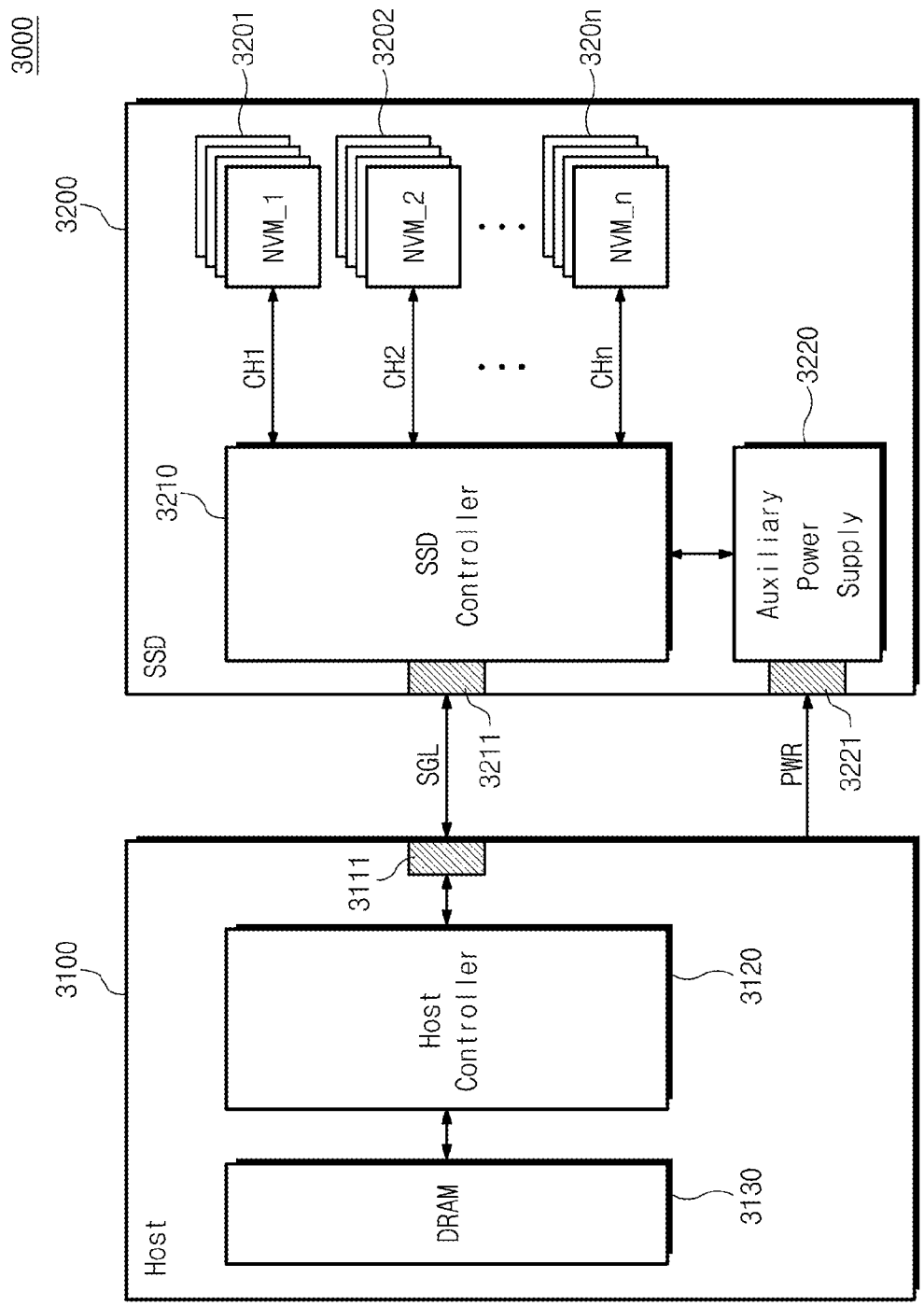
FIG. 15 is a block diagram illustrating a solid state drive system comprising a nonvolatile memory according to an embodiment of the inventive concept.

FIG. 15 is a block diagram illustrating a solid state drive system 3000 comprising nonvolatile memory according to the inventive concept.

Referring to FIG. 15, solid state drive (SSD) system 3000 comprises a host 3100 and an SSD 3200. Host 3100 comprises a host interface 3111, a host controller 3120, and a DRAM 3130.

Host 3100 writes data in SSD 3200 or reads data from SSD 3200. Host controller 3120 transfers signals SGL such as a command, an address, a control signal, and the like to SSD 22000 via host interface 3111. DRAM 3130 may be a main memory of host 3100.

SSD 3200 exchanges signals SGL with host 3100 via host interface 3211, and is supplied with a power via a power connector 3221. SSD 3200 comprises a plurality of nonvolatile memories 3201 to 320n, an SSD controller 3210, and an auxiliary power supply 3220. Herein, nonvolatile memories 3201 to 320n may be implemented by not only a NAND flash memory but also nonvolatile memories such as PRAM, MRAM, ReRAM, and the like.

Nonvolatile memories 3201 to 320n can be used as a storage medium of SSD 3200. Nonvolatile memories 3201 to 320n can be connected with SSD controller 3210 via a plurality of channels CH1 to CHn. One channel may be connected with one or more nonvolatile memories. Nonvolatile memories connected with one channel may be connected with the same data bus.

SSD controller 3210 exchanges signals SGL with host 3100 via host interface 3211. Herein, the signals SGL may include a command, an address, data, and the like. SSD controller 3210 may be configured to write or read out data to or from a corresponding nonvolatile memory according to a command of host 3100. SSD controller 3210 will be more fully described with reference to FIG. 16.

Auxiliary power supply 3220 is connected with host 3100 via power connector 3221. Auxiliary power supply 3220 is charged by a power PWR from host 3100. Auxiliary power supply 3220 can be placed inside or outside SSD 3200. For example, auxiliary power supply 3220 may be put on a main board to supply the auxiliary power to SSD 3200.

Figure 16:
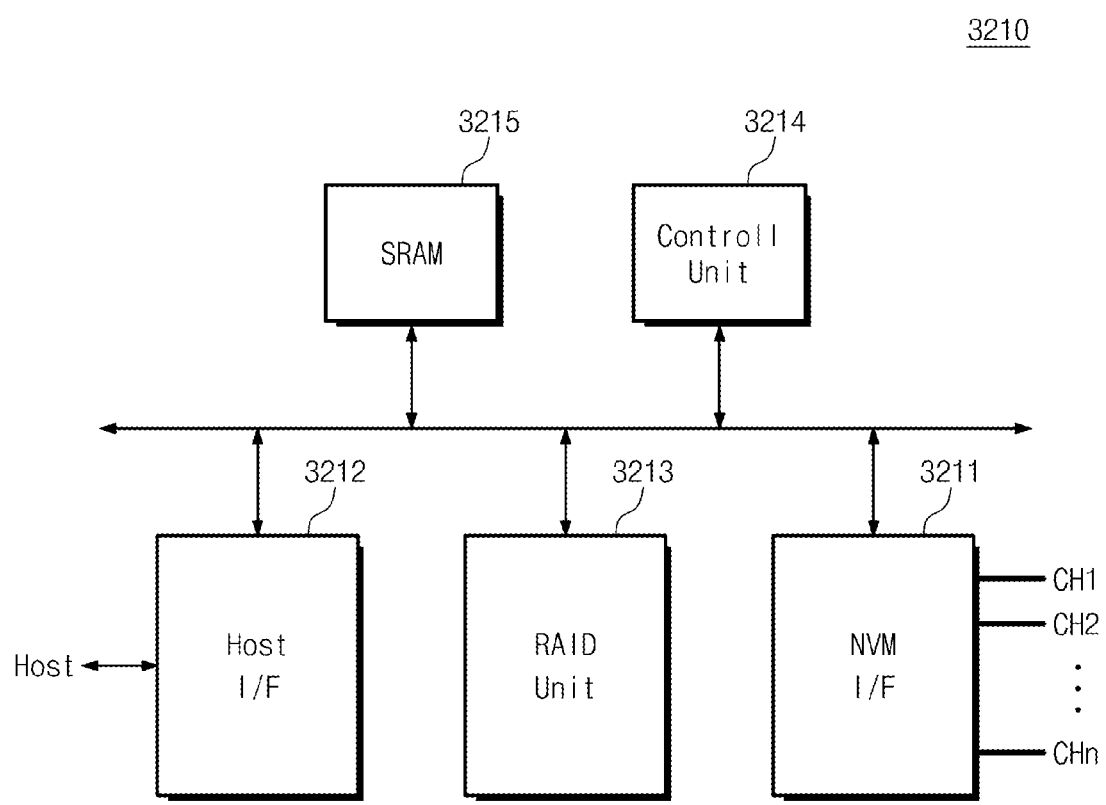
FIG. 16 is a block diagram illustrating an SSD controller in FIG. 15.

FIG. 16 is a block diagram illustrating an example of SSD controller 3210 of FIG. 15.

Referring to FIG. 16, SSD controller 3210 comprises an NVM interface 3211, a host interface 3212, a RAID unit 3213, a control unit 3214, and an SRAM 3215.

NVM interface 3211 scatters data transferred from a main memory of host 2100 to channels CH1 to CHn, respectively. NVM interface 3211 transfers data read from nonvolatile memories 3201 to 320n to host 3100 via host interface 3212.

Host interface 3212 provides an interface with an SSD 3200 according to the protocol of host 3100. Host interface 3212 may communicate with host 3100 using a standard such as Universal Serial Bus (USB), Small Computer System Interface (SCSI), PCI express, ATA, Parallel ATA (PATA), Serial ATA (SATA), Serial Attached SCSI (SAS), etc. Host interface 3212 performs a disk emulation function which enables host 3100 to recognize SSD 3200 as a hard disk drive (HDD).

As described with reference to FIG. 1, RAID unit 3213 may generate a plurality of different RAID parity data using data to be stored in a hot page to protect the reliability of data in a hot memory block. Thus, it is possible to prevent loss of data stored in a hot page.

Control unit 3214 may be used as a working memory to perform an overall operation. DRAM 3214 may be used as a buffer to store data temporarily.

SRAM 3215 may be used to drive software which efficiently manages nonvolatile memories 3201 to 320n. SRAM 3215 may store metadata input from a main memory of host 3100 or cache data. At a sudden power-off operation, metadata or cache data stored in SRAM 3215 may be stored in nonvolatile memories 3201 to 320n using an auxiliary power supply 3220.

SSD system 3000, as described above, may generate a plurality of different RAID parity data using data to be stored in one hot page to protect the reliability of data in a hot memory block. Thus, it is possible to prevent data stored in a hot page from being damaged.

Figure 17:
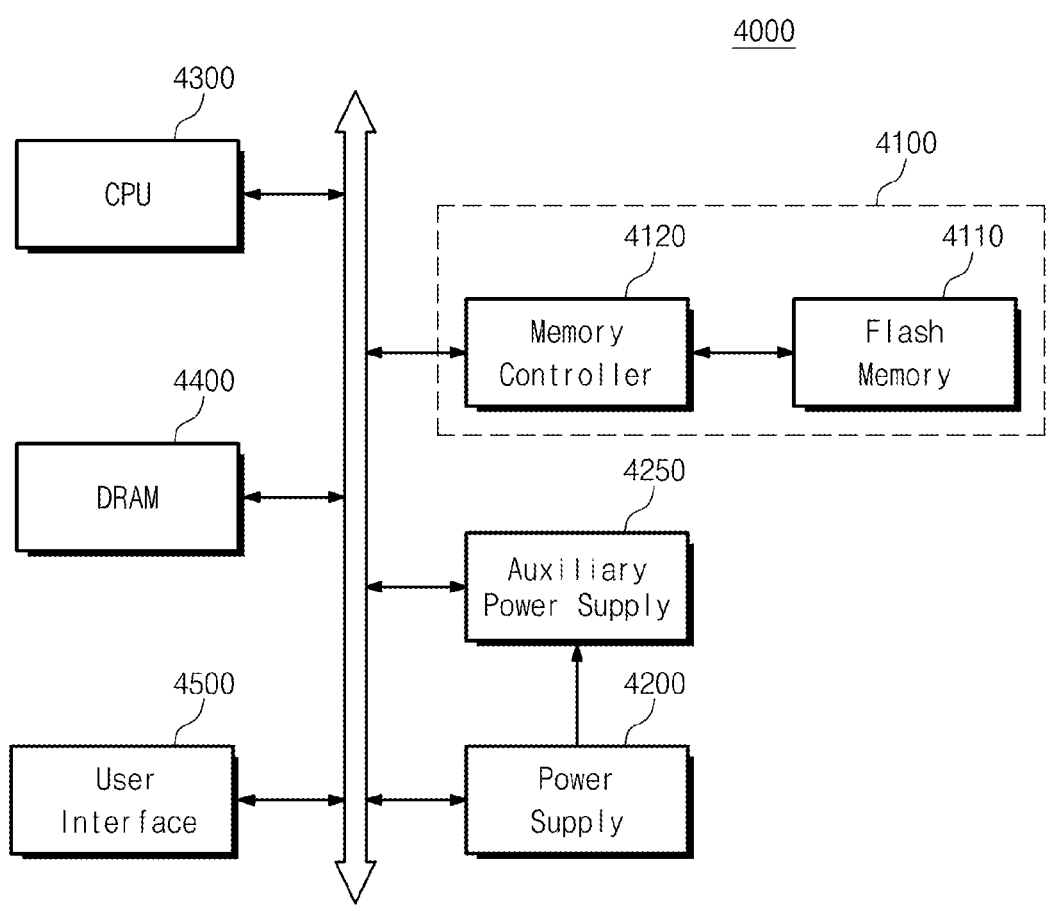
FIG. 17 is a block diagram illustrating an electronic device comprising a flash memory system according to an embodiment of the inventive concept.

FIG. 17 is a block diagram illustrating an electronic device 4000 comprising a flash memory system according to an embodiment of the inventive concept. Herein, an electronic device 4000 may be a personal computer or a handheld electronic device such as a notebook computer, a cellular phone, a PDA, a camera, and the like.

Referring to FIG. 17, electronic device 4000 may include a memory system 4100, a power supply device 4200, an auxiliary power supply 4250, a CPU 4300, a DRAM 4400, and a user interface 4500. Memory system 4100 may include a flash memory 4110 and a memory controller 4120. Memory system 4100 can be embedded within electronic device 4000.

Electronic device 4000, as described above, may generate a plurality of different RAID parity data using data to be stored in one hot page to protect the reliability of data in a hot memory block. Thus, it is possible to prevent data stored in a hot page from being damaged.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A memory system, comprising:
    a nonvolatile memory comprising a plurality of memory blocks; and
    a controller configured to control the nonvolatile memory;
    wherein the controller identifies at least one of the memory blocks as a hot memory block and generates at least first and second RAID parity data based on first data corresponding to a first hot page of the hot memory block, wherein the first data and the first RAID parity data form part of a first write stripe, and the second RAID parity data forms part of a second write stripe different from the first write stripe.

2. The memory system of claim 1, wherein the controller generates the first RAID parity data by performing an XOR operation on the first data, and second data corresponding to a second hot page forming part of the second write stripe.

3. The memory system of claim 2, wherein the controller comprises:
    a first buffer configured to store the first data and the second data; and
    a second buffer configured to store a result of the XOR operation.

4. The memory system of claim 3, wherein the first and second data are maintained at the first buffer until generation of the first RAID parity data is completed.

5. The memory system of claim 4, wherein data stored in the second buffer is reset after generation of the first RAID parity data is completed.

6. The memory system of claim 1, wherein selected data stored in a hot page among the first or second parity stripe is further stored in an area of the nonvolatile memory outside the hot memory block.

7. The memory system of claim 6, wherein if data stored in the first or second hot pages is read failed, the controller recovers the read failed data using the selected data.

8. The memory system of claim 1, wherein the hot memory block is a memory block having a number of erase cycles larger than a predetermined number.

9. The memory system of claim 1, wherein the nonvolatile memory comprises a plurality of memory cells arranged in a three-dimensional structure and the hot memory block comprises memory cells sharing a word line adjacent to a common source line.

10. A data management method for a memory system comprising a controller and a plurality of memory blocks, the method comprising:
    storing, by the controller, first data and second data to be stored in a hot memory block of the memory blocks in a first buffer;
    transferring, by the controller, the first data stored in the first buffer to a second buffer to program the first data in the hot memory block; and
    generating, by the controller, RAID parity data based on the first and second data, wherein the RAID parity data and the first data form part of the same write stripe.

11. The method of claim 10, wherein the first buffer maintains the second data until the RAID parity data is generated under control of the controller.

12. The method of claim 10, further comprising resetting, by the controller, the second buffer after the RAID parity data is generated.

13. The method of claim 10, wherein the RAID parity data is generated by performing an XOR operation on the first data, the second data, and at least one unit of the user data constituting the write stripe under control of the controller.

14. The method of claim 10, further comprising generating, by the controller, additional RAID parity data based on the first and second data, wherein the additional RAID parity data and the second data form part of the same write stripe.

15. The method of claim 10, wherein the hot memory block comprises a plurality of memory cells arranged in a three-dimensional structure.

16. A memory system comprising:
    a nonvolatile memory comprising a plurality of memory cells arranged in a three-dimensional structure; and
    a controller configured to control the nonvolatile memory, wherein the controller identifies memory cells adjacent to a common source line as a plurality of hot pages, wherein each of the hot pages is used to generate at least two different units of RAID parity data.

17. The memory system of claim 16, wherein the hot pages correspond to memory cells connected to a first word line adjacent to the common source line.

18. The memory system of claim 17, wherein the controller identifies memory cells corresponding to word lines other than the first word line as a plurality of normal pages, and normal pages generating one unit of RAID parity data correspond to different word lines, respectively.

19. The memory system of claim 16, wherein the RAID parity data is generated by performing an XOR operation on the data corresponding to at least two different write stripes.

20. The memory system of claim 16, wherein the at least two different units of RAID parity data correspond to at least two different parity stripes.

* * * * *